(12) United States Patent
Meyer

(10) Patent No.: US 6,810,389 B1
(45) Date of Patent: Oct. 26, 2004

(54) SYSTEM AND METHOD FOR FLEXIBLE PACKAGING OF SOFTWARE APPLICATION LICENSES

(75) Inventor: Marc A. Meyer, Woodside, CA (US)

(73) Assignee: Synopsys, Inc., Mountain View, CA (US)

( * ) Notice: Subject to any disclaimer, the term of this patent is extended or adjusted under 35 U.S.C. 154(b) by 738 days.

(21) Appl. No.: 09/710,685

(22) Filed: Nov. 8, 2000

(51) Int. Cl.[7] .............................................. G06F 17/60
(52) U.S. Cl. ............................ 705/59; 705/51; 705/57; 713/200
(58) Field of Search .............................. 705/59, 50–58; 713/200

(56) References Cited

U.S. PATENT DOCUMENTS

| | | | | |
|---|---|---|---|---|
| 5,204,897 A | * | 4/1993 | Wyman | .......................... 380/4 |
| 5,671,412 A | | 9/1997 | Christiano | .................. 395/615 |

FOREIGN PATENT DOCUMENTS

| | | | | |
|---|---|---|---|---|
| EP | 0332304 | * | 2/1989 | ............. G06F/1/00 |

OTHER PUBLICATIONS

Chavez et al., "Software Component Licensing: A Primer", Sep./Oct. 1998, IEEE Software, pp. 47–53.*
Hauser, "Does Licensing Require New Access Control Techniques?", 1993 ACM.*
"FLEXlm End Users Guide", Aug. 2000, Globetrotter Software, Inc., Version 7.1.

* cited by examiner

*Primary Examiner*—James P. Trammell
*Assistant Examiner*—Jalatee Worjloh
(74) *Attorney, Agent, or Firm*—Bever, Hoffman & Harms, LLP; Jeanette S. Harms

(57) ABSTRACT

A method for providing licenses to client computer systems to allow the client computer systems to use licensed software products includes receiving a request for a feature license for a feature included in a package, filtering the request based on whether the license requires the checkout of a parent license, granting a package license to the client computer system when the client computer system is allowed to receive the package license according to a license policy and denying the package license to the client computer system when the client computer system is not allowed to receive the package license according to the license policy. The request may include checkout data that includes at least one desired feature attribute. A software license server for providing licenses to client computer systems to allow the client computer systems to use licensed software products, the software license server includes at least one memory having program instructions and at least one processor configured to use the program instructions to receive a request for a feature license for a feature included in a package, filter the request based on whether the license requires the checkout of a parent license, grant a package license to the client computer system when the client computer system is allowed to receive the package license according to a license policy and deny the package license to the client computer system when the client computer system is not allowed to receive the package license according to the license policy.

39 Claims, 32 Drawing Sheets

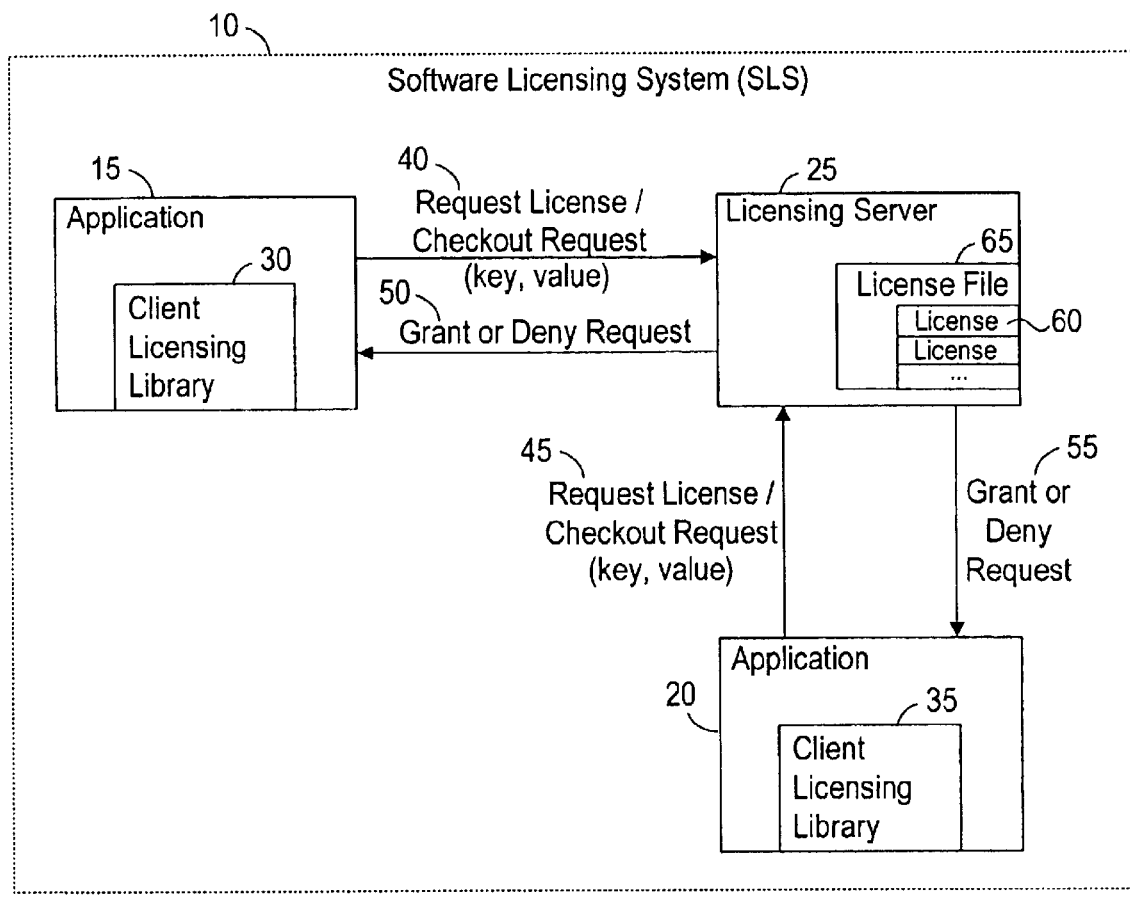
Fig. 1 - Prior Art

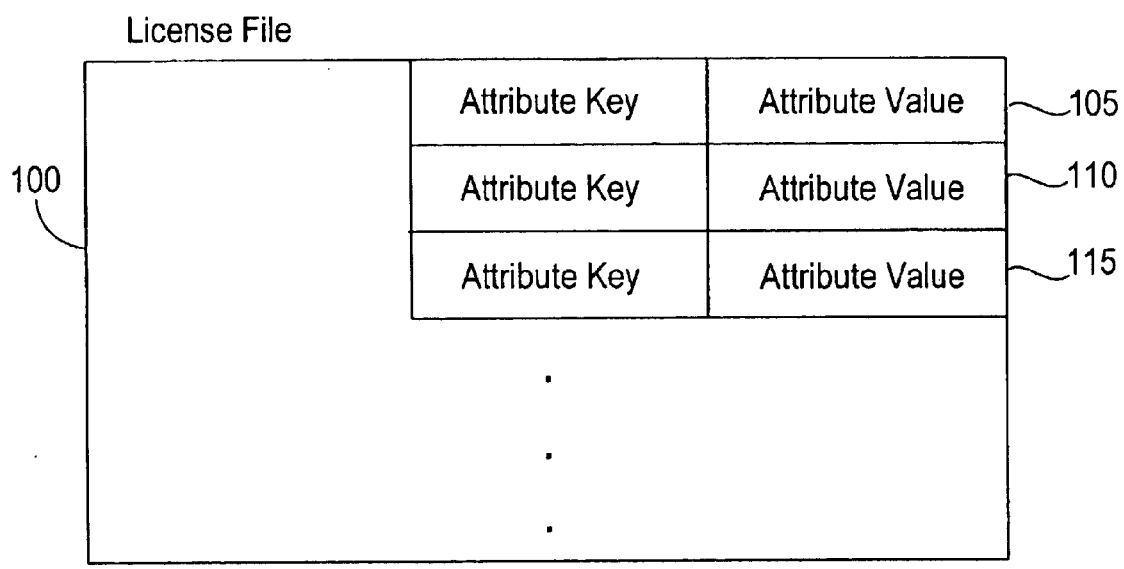
Fig. 2 - Prior Art

License File

| 205 | License Count | 5 | 210 |
|---|---|---|---|
| 215 | Feature Name | Spell Checker | 220 |
| 225 | End Date | 9/1/1999 | 230 |
| 235 | License Version | 1.2 | 240 |

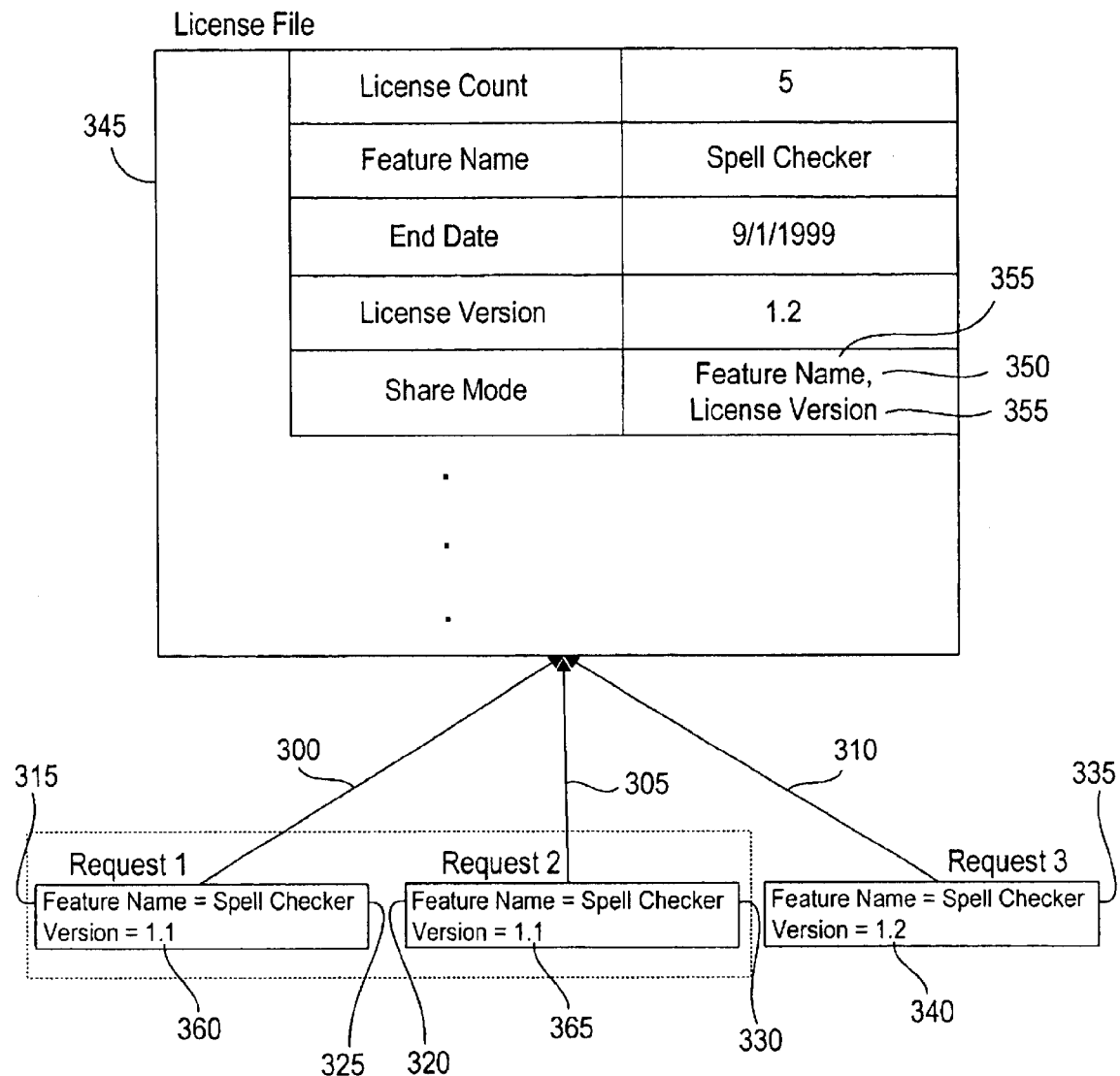
Fig. 4 - Prior Art

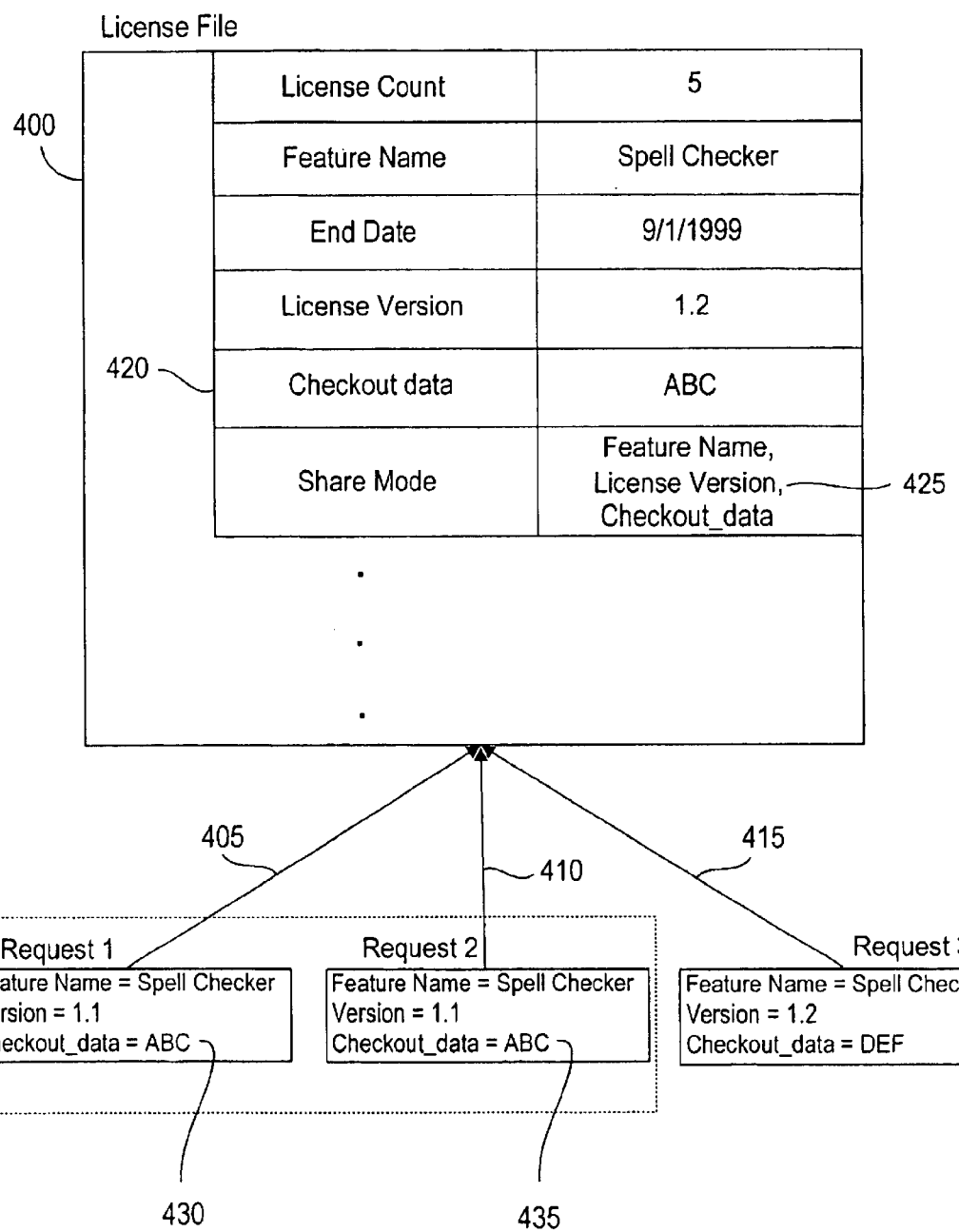
Fig. 5 - Prior Art

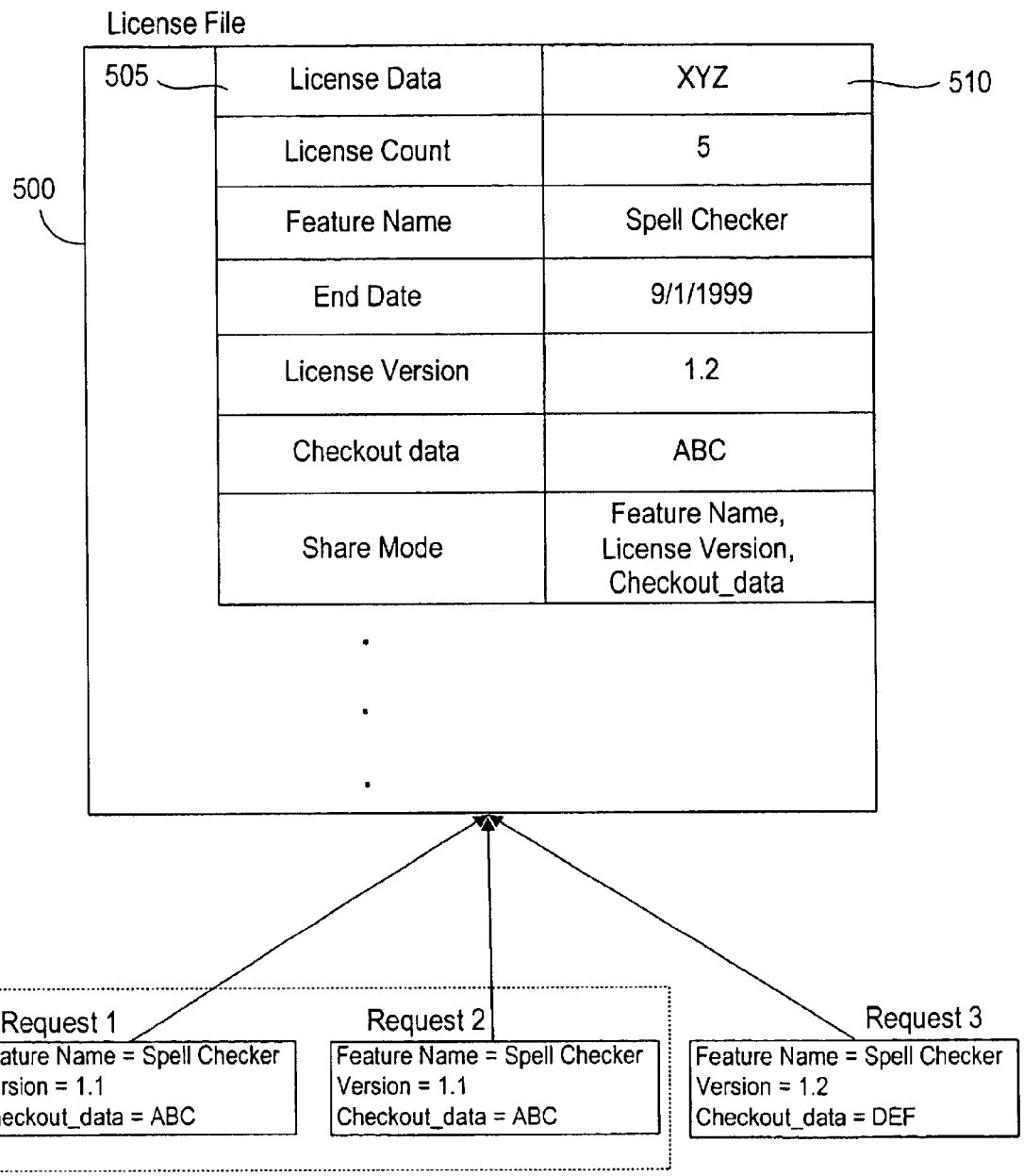
Fig. 6 - Prior Art

License File

| License Data | M-Package Definition String | 805 |
| --- | --- |
| License Count | 5 |
| Feature Name | Spell Checker |
| End Date | 9/1/1999 |
| License Version | 1.2 |
| Share Mode | Feature Name, License Version, Checkout_data |

800

Specifies grouping mode of features

Fig. 9

| Checkout Request | Checkout data | Share modes | Modified checkout data | f1 | f2 | f3 | Total |
|---|---|---|---|---|---|---|---|
| f1 | | | | 1 | | | 1 |
| f2 | | | | | 1 | | 2 |
| f3 | | | | | | 1 | 3 |

Fig. 30

| Checkout Request | Checkout data | Share modes | Modified checkout data | f1 | f2 | f3 | f4 | f5 | Pkg |
|---|---|---|---|---|---|---|---|---|---|
| f1 | | | :f1 | 1 | | | | | 1 |
| f2 | | | NodeNumber(f2) : Slot (f2, " ") = 2 : 0 | | 1 | | | | 2 |
| f3 | | | NodeNumber (f3) : Slot (f3, " ") = 2 : 0 | | | 1 | | | 2 |
| f2 | | | NodeNumber (f2) : Slot (f2, " ") = 2 : 1 | | 1 | | | | 3 |
| f4 | | | NodeNumber (f4) = :3 | | | | 1 | | 4 |
| f5 | | | NodeNumber (f5) = :3 | | | | | 1 | 4 |
| f4 | | | NodeNumber (f4) = :3 | | | | 2 | | 4 |

Fig. 31

| Checkout Request | Checkout data | Share modes | Modified checkout data | f1 | f2 | f3 | Pkg |
|---|---|---|---|---|---|---|---|
| f1 | AA | checkout data | AA :f1 | 1 | | | 1 |
| f2 | BB | checkout data | AA : NodeNumber (f2) : Slot (f2, " ") = AA : 2 : 0 | | 1 | | 2 |
| f3 | CC | checkout data | BB : NodeNumber (f3) : Slot (f3, " ") = BB : 2 : 0 | | | 1 | 3 |

Fig. 32

SYSTEM AND METHOD FOR FLEXIBLE PACKAGING OF SOFTWARE APPLICATION LICENSES

BACKGROUND OF THE INVENTION

1. Field of the Invention

The present invention relates to computer science. More particularly, the present invention relates to a system and method for flexible packaging of software application licenses.

2. Background

A Software Licensing System (SLS) is typically used to restrict the operation of a software program or system of programs, sometimes called an application, to holders of a verifiable software and/or hardware license. The restrictive information contained within a license may specify what entity may execute the application, when the application may be executed, how many copies of the application may be executed, and how the application may be run. The FLEXlm™ product by Globetrotter Software, Inc. of Campbell, Calif. is an example of a commercially available SLS. Such systems are also discussed in U.S. Pat. No. 5,671,412 entitled "License Management System for Software Applications" to Matt Christiano.

An SLS typically counts the number of authorized licenses in use, and imposes a restriction on the number, or count, of licenses that may be in use contemporaneously. An SLS may also cause the application to wait for a license, or notify the application of the availability of the license when it becomes available in the future.

An SLS may reside completely in the licensed application, or operate in the form of a client-server architecture. Client-server architecture is typically used to keep a count of license uses across multiple invocations of a program, and possibly across multiple computers. An SLS operates on licenses that can only be generated by an authorized entity, which is typically the creator of the application being licensed.

Turning now to FIG. 1, a block diagram that illustrates a typical SLS is presented. A typical SLS 10 includes at least one application 15, 20 and a licensing server 25. Each application 15, 20 includes a client licensing library 30, 35. In operation, an application 15, 20 within an SLS 10 requests a license 40, 45 from the licensing server 25. This request is referred to as a performing a "checkout" and is typically performed over a secure channel. The licensing server 25 and the application 15, 20 cooperate to authenticate the license and to verify that the license is intended to allow the operation of the application in the current configuration, environment, and at the current time. The licensing server 25 and the application 15, 20 may also verify the integrity of the licensing system components and verify version and platform compatibility. Based on the result of these checks, the licensing server either grants or denies (50, 55) a license request. If the license request is denied, the application 15, 20 may not use the feature associated with the license request.

A typical SLS maintains licenses for multiple features, or functional subsets, of an application. These features are also referred to as attributes. Attributes are key/value data pairs that are included in the licensing request 40, 45 and contain information that may originate in the environment of the applications, or be explicitly set by the application. These licensing request attributes are used in conjunction with similar attributes found in the license 60 or in the license server 25 to determine whether a license 60 satisfies a licensing request 40, 45. A typical license file 65 is illustrated in FIG. 2. A license file 100 typically includes at least one (attribute key, attribute value) pair 105, 110, 115.

FIG. 3 is a block diagram that illustrates examples of (attribute key, attribute value) pairs found in a typical license file. License 200 includes four attributes. The first attribute key 205 is the license count and its associated attribute value 210 is the number five, indicating that five licenses may be checked out. The second attribute key 215 is the feature name, and the associated attribute value 220 is "Spell Checker". A license request can be met by this license only when the feature name in the license request exactly matches the feature name in the license. In the present example, the license request must include a feature name of "Spell Checker". The third attribute indicates an end date (225) of Sep. 1, 1999 (230). A license request can be met by this license only when the license request date is less than the end date, Sep. 1, 1999. The fourth attribute indicates a version number (235) of 1.2 (240). A license request can be met by this license only if the requested version number is less than or equal to 1.2.

An SLS may use a "share modes" attribute to determine when multiple license requests may be satisfied using the same underlying license. A share modes attributre specifies a list of attributes that, if matched in any separate license requests, will be satisfied using the same license. The rules for matching are typically based on identity (equality) of both the keys and values of all the attributes in the share modes attribute set. In other words, two requests are satisfied from the same license when their share modes attribute sets are identical. This matching is typically attempted only among licensing requests for the same feature. An illustration of share modes is presented in FIG. 4.

Turning now to FIG. 4, a block diagram that illustrates share modes is presented. Request 1 (300), Request 2 (305) and Request 3 (310) represent three separate license requests. License requests 1 (300) and 2 (305) have identical attribute keys (315, 320) and attribute values (325, 330). License request 3 (310) includes the same feature attribute value 335, but a different version attribute value 340. License 345 includes a share mode attribute value 350 consisting of two attribute keys: feature name 355 and license version 355. Since both Request 1 (300) and Request 2 (305) include all attribute keys listed in the share mode attribute value 355, and since the attribute values for both Request 1 (325) and Request 2 (330) are identical, Request 1 (300) and Request 2 (305) are satisfied by the same license (345). Since Request 3 (310) includes an attribute value 340 that is different from attribute value 360 and 365, Request 3 (310) requires an additional license 345. Thus, two separate licenses are required for the three license requests.

One type of attribute is "Checkout data". The checkout data attribute value is typically set in a licensed application and accompanies a licensing request. The checkout data may be part of the share modes. If the checkout data is part of the share modes, multiple checkouts for the same feature, with the same checkout data attribute value, are satisfied with the same license. The checkout data attribute is described in more detail with reference to FIG. 5.

Turning now to FIG. 5, a block diagram that illustrates the checkout data attribute is presented. FIG. 5 is identical to FIG. 4, except that license 400 and license requests 1 (405) 2 (410) and 3 (415) include a checkout data attribute 420, and the checkout data attribute 420 is included in the share modes attribute value 425. In the example, since the Request 1 (405) and Request 2 (410) checkout data attribute values (430, 435) are identical, both license requests are satisfied by the same license. License Request 3 (415) includes a different checkout data value. Consequently, license request 3 (415) is satisfied by a separate license 400.

A license may also include a "license data" attribute that is typically initialized when the license is generated. The license data attribute value is typically used to influence operation of the SLS. FIG. 6 is a block diagram that illustrates the license data attribute. FIG. 6 is identical to FIG. 5, except that license 500 includes a license data attribute key 505 and value 510.

A typical SLS includes support for the bundling of products into "packages". For the purposes of this disclosure, the term "package" refers to a generic grouping of different component products included within that package. The component products are typically programs, although in an alternate embodiment, packages can be components of higher-level packages. The term "software product" is considered to be a program, package, or other similar type of licensed software product. The term "program" refers to any software process, such as an application program (word processor, spreadsheet, drawing program, etc.), utility program, resident or background program, etc. For example, a package can include different component programs that are conveniently specified within the package heading. A package allows a license sharing policy to be specified regarding how a combination of products consumes a single package license. This allows a single license, for example, to enable the use of one OR another of a set of products at different times. However, this packaging concept is rarely used because it does not allow for groups of components in the same package to have different sharing policies. For example, there is no way of specifying that the same package license apply to any number of components in a first group of package components but only one component in a second group of package components.

Typical software licensing systems support only homogenous groups of features that share the same behavior. They are too inflexible to support different sharing policies for groups of components within the same package. Due to the inflexibility of typical licensing systems, software vendors typically price a licensed system using a pricing model that is based upon an assumed usage. Contract provisions between a software vendor and a software user are relied upon to ensure licensed products are used according to a pricing model. Due to the difficulty of monitoring licensed component usage to ensure compliance with contract provisions, it would be desirable to enable enforcement of a relatively flexible licensing policy within a software licensing system itself. Accordingly, a need exists in the prior art for a system and method for grouping licenses that supports different sharing policies for groups of components within the same package. Additionally, a further need exists for such a system and method that enables enforcement of such sharing policies without requiring independent monitoring of licensed component usage.

SUMMARY OF THE INVENTION

A method for providing licenses to client computer systems to allow the client computer systems to use licensed software products includes receiving a request for a feature license for a feature included in a package, filtering the request based on whether the license requires the checkout of a parent license, granting a package license to the client computer system when the client computer system is allowed to receive the package license according to a license policy and denying the package license to the client computer system when the client computer system is not allowed to receive the package license according to the license policy. The request may include checkout data that includes at least one desired feature attribute. A software license server for providing licenses to client computer systems to allow the client computer systems to use licensed software products, the software license server includes at least one memory having program instructions and at least one processor configured to use the program instructions to receive a request for a feature license for a feature included in a package, filter the request based on whether the license requires the checkout of a parent license, grant a package license to the client computer system when the client computer system is allowed to receive the package license according to a license policy and deny the package license to the client computer system when the client computer system is not allowed to receive the package license according to the license policy.

BRIEF DESCRIPTION OF THE DRAWINGS

FIG. 1 is a block diagram that illustrates a typical Software Licensing System (SLS).

FIG. 2 is a block diagram that illustrates a typical license file.

FIG. 3 is a block diagram that illustrates examples of (attribute key, attribute value) pairs found in a typical license file.

FIG. 4 is a block diagram of a typical license file that features share modes.

FIG. 5 is a block diagram of a typical license file that includes a checkout data attribute.

FIG. 6 is a block diagram of a typical license file that includes a license data attribute.

FIG. 9 is a block diagram that illustrates a Multi-Package (M-Package) license in accordance with one embodiment of the present invention.

FIG. 30 is a table that illustrates performing several license checkouts with a non-M-package license in accordance with one embodiment of the present invention.

FIG. 31 is a table that illustrates performing a license checkout with an M-Package license in accordance with one embodiment of the present invention.

FIG. 32 is a table that illustrates performing a license checkout with an M-Package license and non-blank checkout data and share modes values in accordance with one embodiment of the present invention.

DETAILED DESCRIPTION OF THE PREFERRED EMBODIMENTS

Those of ordinary skill in the art will realize that the following description of the present invention is illustrative only. Other embodiments of the invention will readily suggest themselves to such skilled persons having the benefit of this disclosure.

This invention relates to computer systems. More particularly, the present invention relates to a license management system. The invention further relates to machine-readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

According to embodiments of the present invention, a software licensing system supports grouping licenses in a manner that enables enforcement of flexible license sharing policies for groups of components within the same package. A licensing server dynamically modifies the contents of the checkout data attribute. A parent license is created for the features to be grouped and the parent license is assigned a share mode of checkout data. The contents of the checkout data attribute are modified dynamically to restrict access to the parent license according to the desired grouping.

Figure 7:
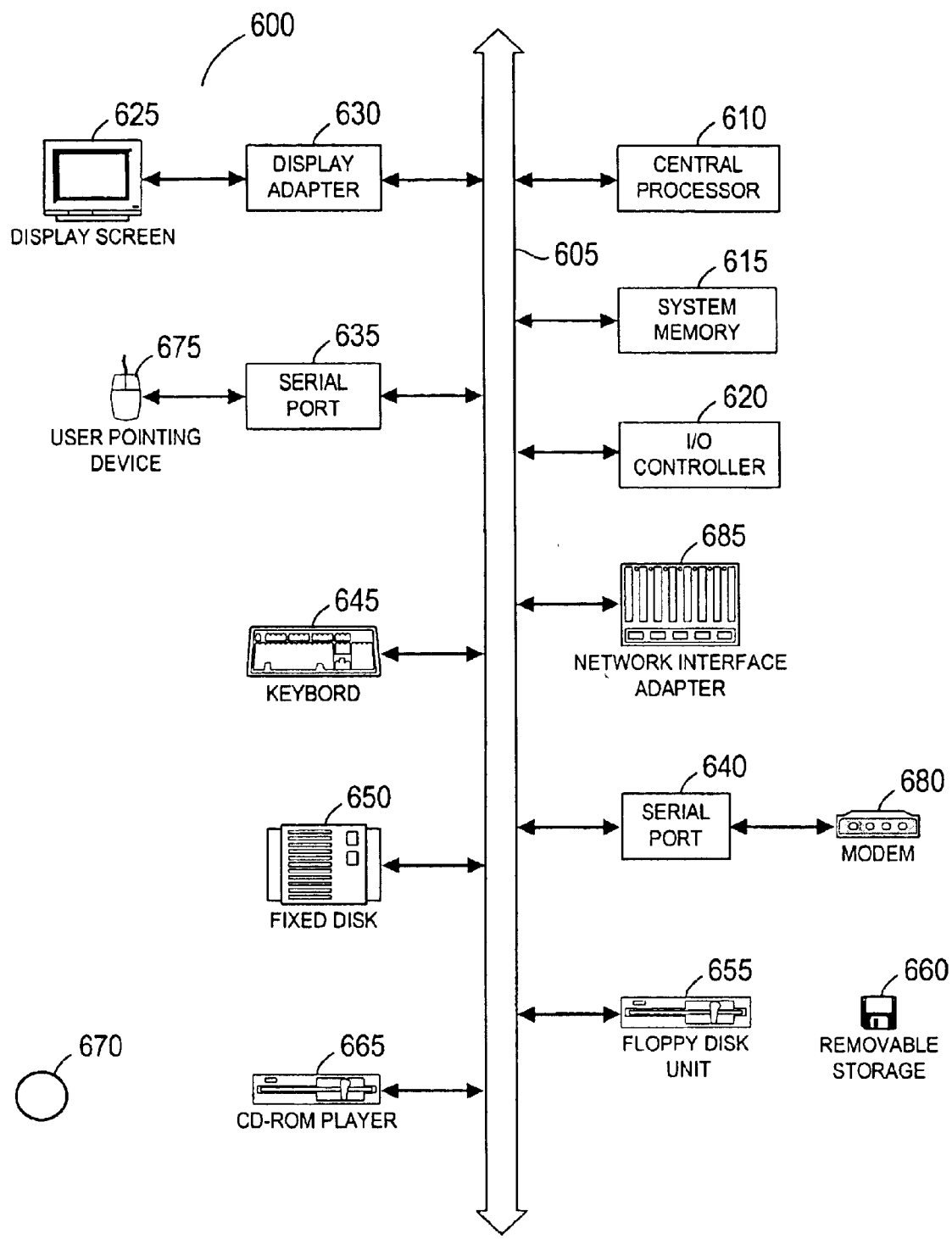
FIG. 7 is a block diagram of a client computer system suitable for implementing aspects of the present invention.

FIG. 7 depicts a block diagram of a client computer system 10 suitable for implementing aspects of the present invention. As shown in FIG. 7, client computer system 600 includes a bus 605 which interconnects major subsystems such as a central processor 610, a system memory 615 (typically RAM), an input/output (I/O) controller 620, an external device such as a display screen 625 via display adapter 630, serial ports 635 and 640, a keyboard 645, a fixed disk drive 650, a floppy disk drive 655 operative to receive a floppy disk 660, and a CD-ROM player 665 operative to receive a CD-ROM 670. Many other devices can be connected, such as a pointing device 675 (e.g., a mouse) connected via serial port 635 and a modem 680 connected via serial port 640. Modem 680 may provide a direct connection to a remote server via a telephone link or to the Internet via a POP (point of presence). Alternatively, a network interface adapter 685 may be used to interface to a local or wide area network using any network interface system known to those skilled in the art (e.g., Ethernet, DSL, AppleTalk™).

Many other devices or subsystems (not shown) may be connected in a similar manner. Also, it is not necessary for all of the devices shown in FIG. 7 to be present to practice the present invention, as discussed below. Furthermore, the devices and subsystems may be interconnected in different ways from that shown in FIG. 7. The operation of a computer system such as that shown in FIG. 7 is readily known in the art and is not discussed in detail in this application, so as not to overcomplicate the present discussion. Code to implement the present invention may be operably disposed in system memory 16 or stored on storage media such as fixed disk 650 or floppy disk 660.

Figure 8:
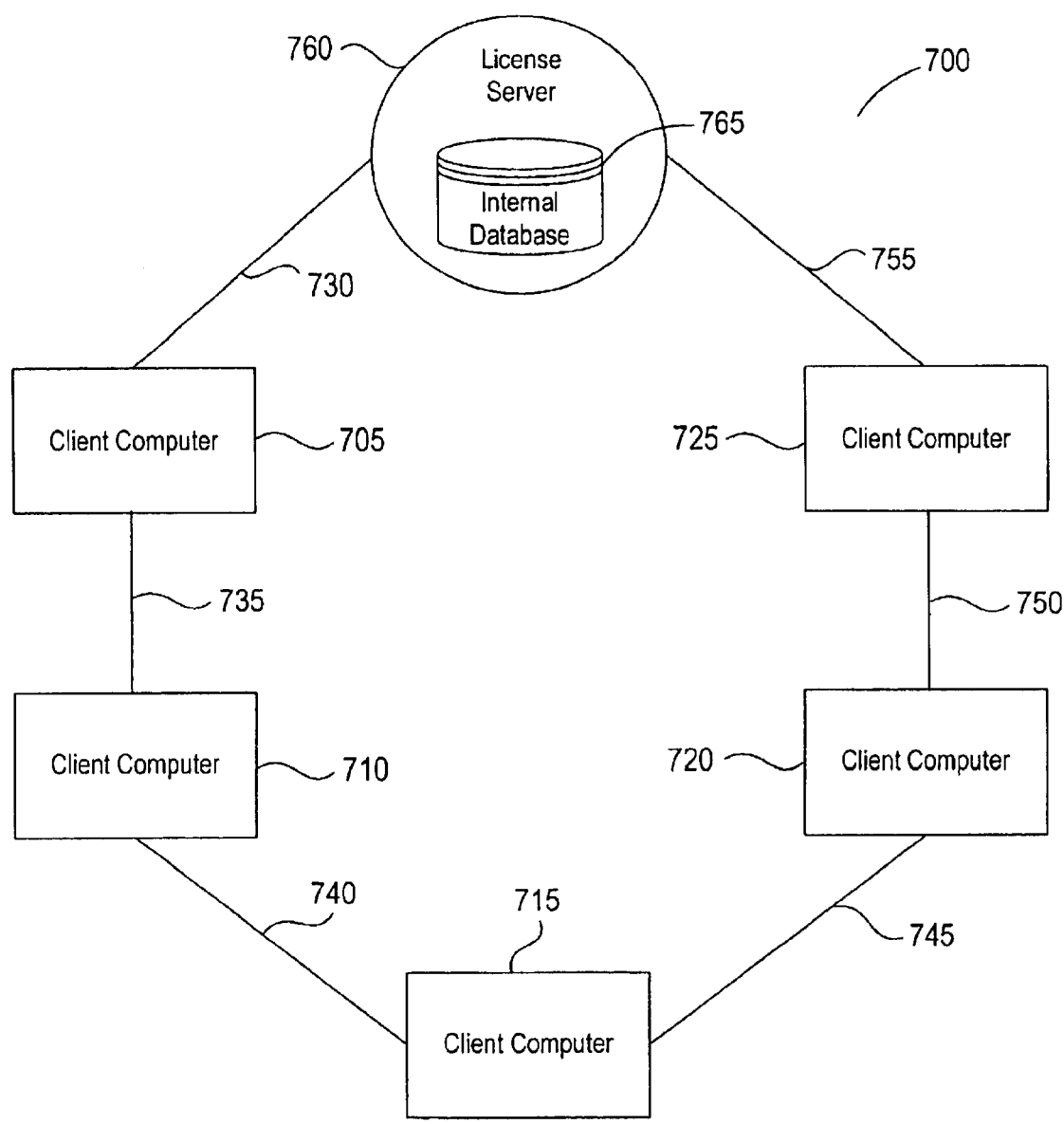
FIG. 8 is a block diagram that illustrates a license management system in accordance with one embodiment of the present invention.

Referring to FIG. 8, a license management system 700 suitable for incorporating the present invention will be described. Individual client computer systems 705, 710, 715, 720, 725 are interconnected by network connections 730, 735, 740, 745, 750, 755. Each computer system 705, 710, 715, 720, 725 serves as a node in the network having its own network address so that other computer systems 705, 710, 715, 720, 725 can send and receive data from any other computer system 705, 710, 715, 720, 725 in the network system 700. A typical client computer system 705, 710, 715, 720, 725 is described in more detail with reference to FIG. 7, above.

Also included in the network system 700 of the present invention is a license server 760, which is connected in network system 700 like computer systems 705, 710, 715, 720, 725. License server 760 may typically include hardware components for implementing license management processes, such as a microprocessor(s) or central processing unit (CPU) and associated components coupled to the microprocessor by a main bus, such as random access memory (RAM), read-only memory (ROM), input/output components, storage devices, etc., as is well known to those skilled in the art. License server 760 either includes or has access to a database 765 implemented on a storage medium such as memory, disk space, or the like.

The license server 760 serves as a "license manager" for the computer systems 705, 710, 715, 720, 725 and for other servers (not shown) that may be included in system 700. License server 760 stores licenses for software programs available to computer systems 705, 710, 715, 720, 725 and assigns or "checks out" these licenses to client computer systems 705, 710, 715, 720, 725 that request a license. For the purposes of this disclosure, the term "license" is used to designate permission or authorization for a client computer system to use or "implement" (run) a single designated software product, such as a program, or to view data incorporated in the software product. The vendor, supplier, or manager ("licensor") of the software typically provides the licenses for the users on the network. For example, if a user wishes to operate a designated computer program on a particular computer system 705, 710, 715, 720, 725 (i.e., run or execute the program on the central processing unit (CPU) of that computer system), then the program (or a license program) instructs the computer system to send out a license request over license management system 700 to the license server 760. The license server 760 receives the license request and determines if the requesting client computer system is allowed to check out or be assigned a license for that program, i.e., allowed to run or use the program. Preferably, a license is checked out to a client computer system only if the requesting computer system is allowed to have the requested license according to a predetermined software license policy.

Internal database 765 can be implemented on a standard storage device or memory device coupled to the license server 760, as is well-known to those skilled in the art, and can be organized as a license file. For example, a hard drive can store license data. Preferably, as described below, the license server creates the internal license database 765 after receiving standard licenses and/or package certificates from an external file or other input source, where each package certificate includes a package description and package licensing data. For the purposes of this disclosure, the term "license database" refers to the internal license database 765.

The internal license database 765 stores entries for each license received from the external file. If a package certificate is received from the external file, the license server examines the package description and determines how many license records are written into the internal license database in an initialization procedure, where each license stored in the internal license database is stored as a license record. The license server examines these license records to determine whether a requesting computer system should receive a license for a designated software product, as described below.

When a license is violated by a client computer system, the license server 760 preferably returns a status message to the requesting computer system that indicates that the computer system would be violating the license policy when using the designated program. The client computer system 705, 710, 715, 720, 725 or program then decides the action to take if a violation has occurred. In some embodiments, the server 760 can decide this action. The action taken depends upon the level of enforcement desired by the provider of the license policy. Different degrees of enforcement to the use of the computer program on the client computer system can be provided depending on the needs of the policy provider. For example, if a lenient enforcement technique is implemented, and if a license request for a designated program is denied, then the violating computer system can display a simple warning to the user while still allowing the designated program to be run on the computer system. If strict enforcement is provided, and a license request is denied, the computer system 700 may immediately cause the designated program to quit on the computer system and not allow the program to be activated and used as long as the license policy is violated. Alternatively, the license server can decide the action to take if a license violation has occurred and can transmit the decided action to the client computer system, which can implement the action.

Turning now to FIG. 9, a block diagram that illustrates an M-package license in accordance with one embodiment of the present invention is presented. M-package license 800 includes a package definition string 805 that is used to specify a grouping mode for features. Exemplary grouping modes are discussed with reference to FIGS. 13–15.

Figure 10:
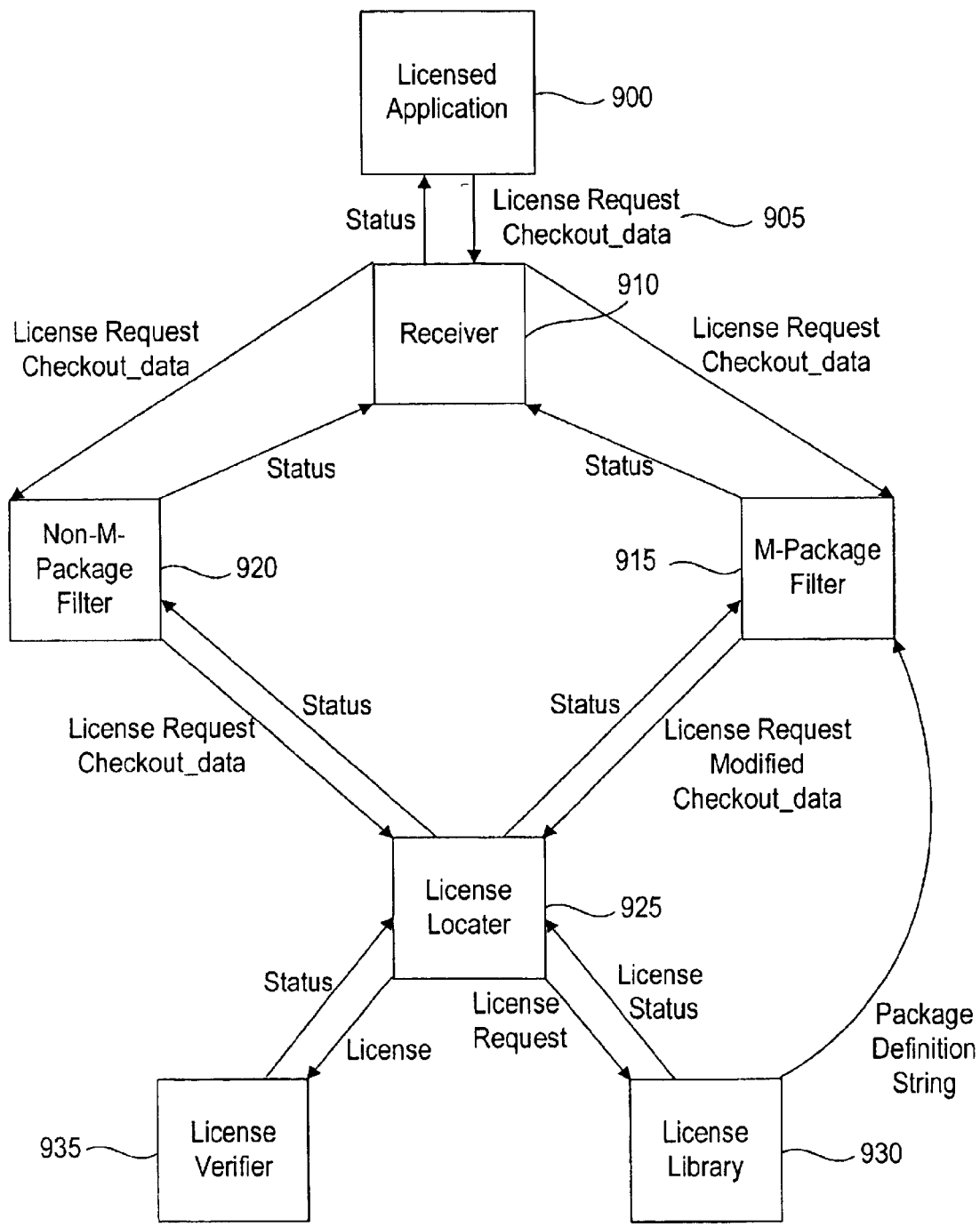
FIG. 10 is a block diagram that illustrates a software license system in accordance with one embodiment of the present invention.

Turning now to FIG. 10, a block diagram that illustrates a software license system in accordance with one embodiment of the present invention is presented. A licensed application 900 issues a license request 905. A receiver 910 receives the license request and determines whether the license request is a Multi-Package, or "M-package" license request. If the license is an M-Package license request, the license request is forwarded to an M-Package filter 915. If the license is not an M-Package license request, the license is forwarded to a non-M-Package filter 920. The M-Package filter 915 modifies the checkout data attribute and forwards the license request and modified checkout data to a license locator 925. The license locator 925 queries a license library 930 for an acceptable license. Once an acceptable license is found, a license verifier 935 verifies the license.

Figure 11:
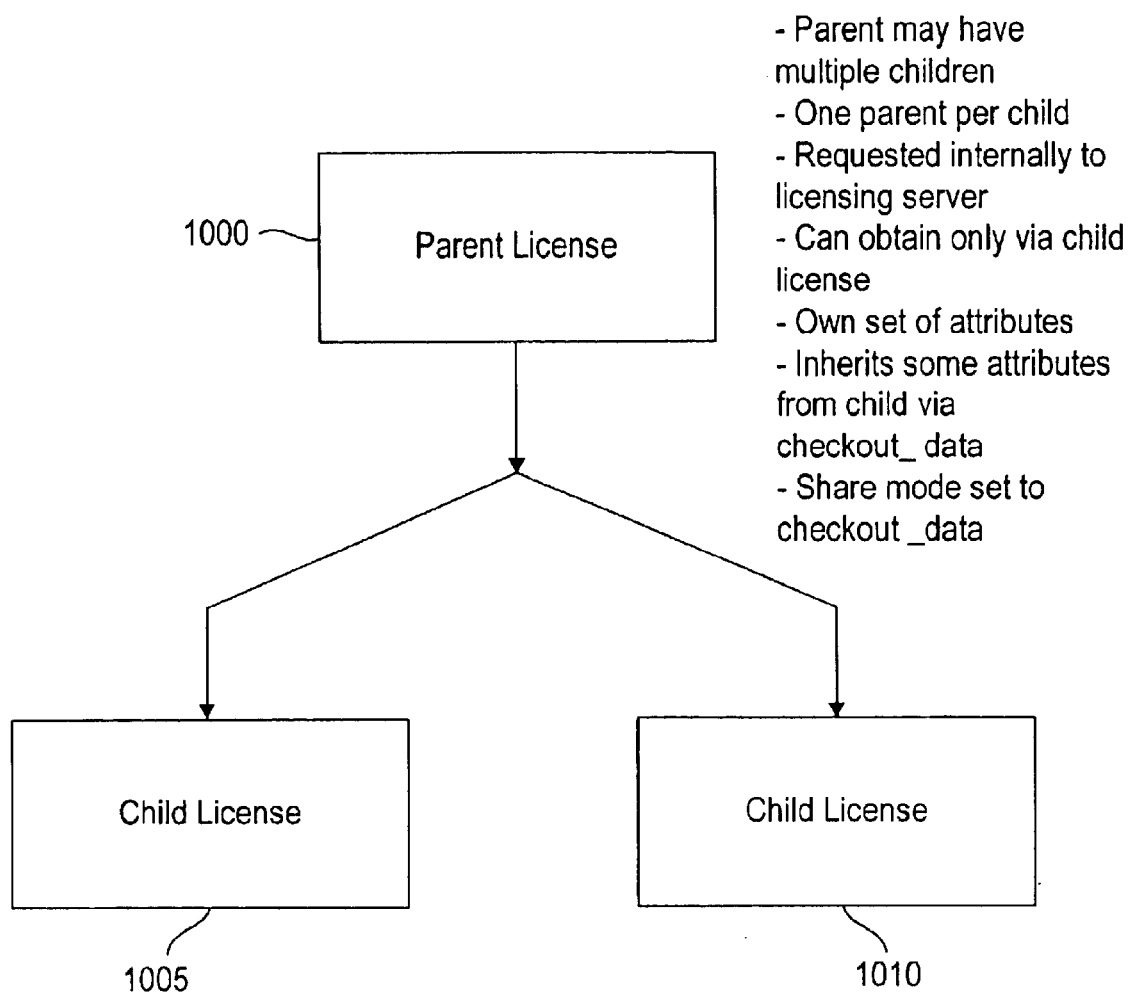
FIG. 11 is a block diagram that illustrates the relationship between a parent license and a child license in accordance with one embodiment of the present invention.

According to one embodiment of the present invention, an SLS includes the ability to associate a license with a "parent license", such that a request for a checkout of the original license (also called the child license) is automatically accompanied by a request for its associated parent. FIG. 11 is a block diagram that illustrates the relationship between a parent license and a child license. Each parent license 1000 may have multiple child licenses (1005 or 1010). There is only one parent license 1000 per child license (1005 or 1010). Parent licenses 1000 are obtained using mechanisms identical to other licenses, but are never explicitly requested by the licensed application. Instead, parent licenses 1000 are requested internally to the licensing server. A child license (1005 or 1010) can only be obtained by obtaining both the child license (1005 or 1010) and its parent license. A parent license 1000 has its own set of attributes, but inherits some attributes from the child license. According to one embodiment of the present invention, the checkout data attribute is used to allow a parent license 1000 to inherit attributes from a child license (1005 or 1010). A parent license 1000 also has its own share mode, which may be different from that of its child (1005 or 1010). According to one embodiment of the present invention, the share mode of a parent license 1000 representing an M-package is set to checkout data.

Figure 12:
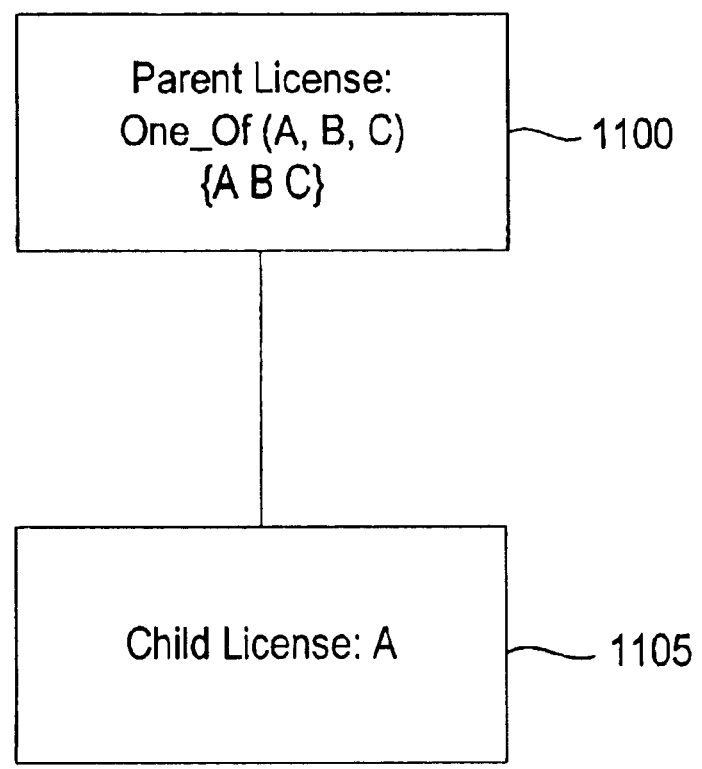
FIG. 12 is a block diagram that illustrates a "one of" policy in accordance with one embodiment of the present invention.

FIGS. 12–15 illustrate license policies that may be implemented according to embodiments of the present invention. FIG. 12 illustrates a "OneOf" policy in accordance with one embodiment of the present invention. In a "OneOf" policy, only one child license in a group may be granted per parent license. In other words, there is a one-to-one correspondence between parent licenses and child licenses. FIG. 12 shows one parent license 1100 and one child license 1105. An additional child license 1105 requires an additional parent license 1100.

Figure 13:
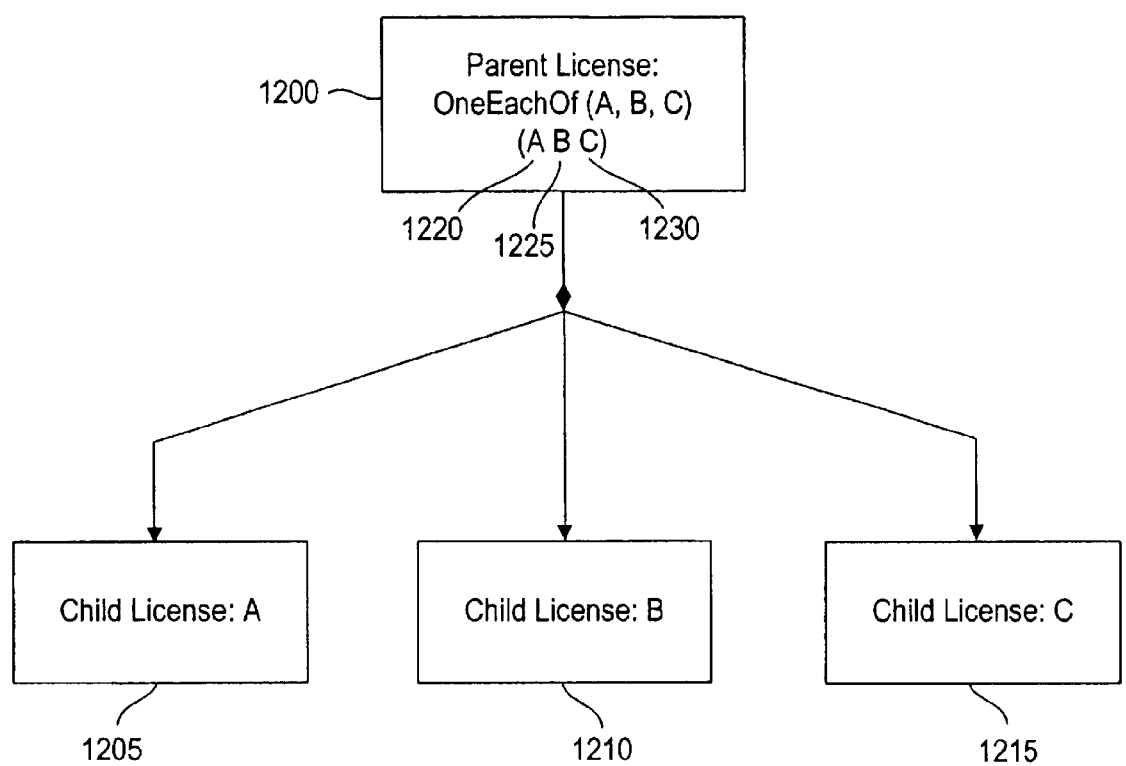
FIG. 13 is a block diagram that illustrates a "OneEachOf" policy in accordance with one embodiment of the present invention.

Turning now to FIG. 13, a block diagram that illustrates a "OneEachOf" policy in accordance with one embodiment of the present invention is presented. In a "OneEachOf" policy, one of each child license in a group may be granted per parent license. In FIG. 13, parent license 1200 includes attributes A (1220), B (1225) and C (1230). Thus, for each parent license 1200, a child license may be granted for A (1205), B (1210) and C (1215).

Figure 14:
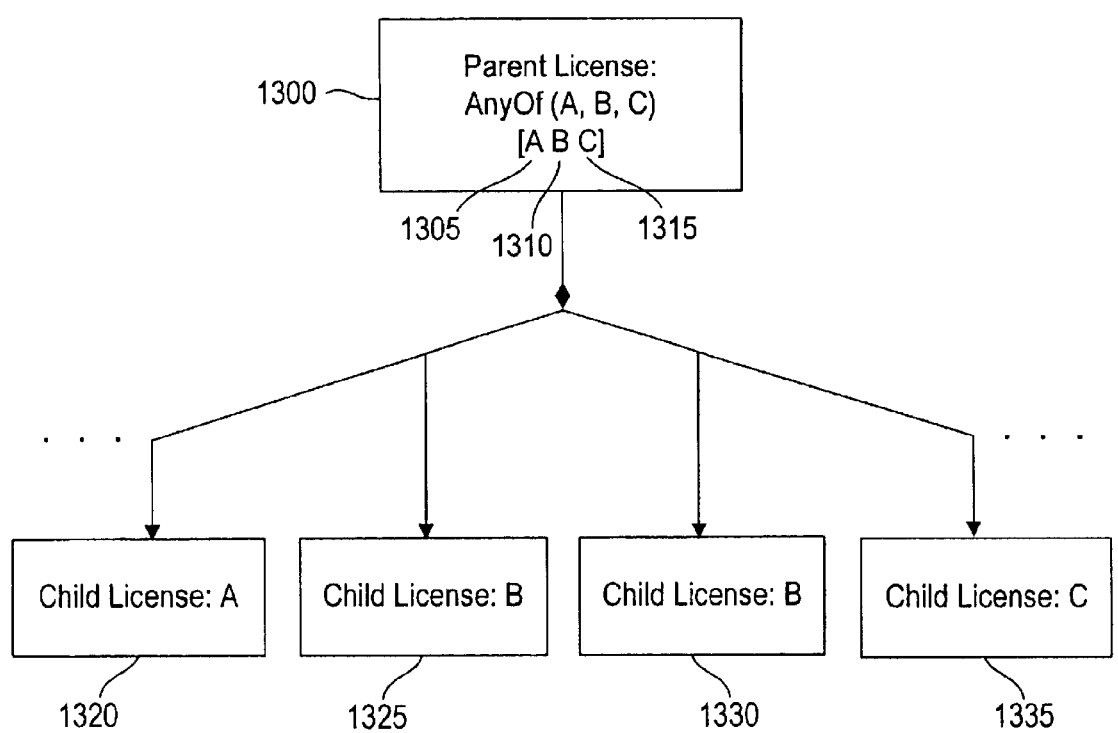
FIG. 14 is a block diagram that illustrates an "AnyOf" policy in accordance with one embodiment of the present invention.

Turning now to FIG. 14, a block diagram that illustrates an "AnyOf" policy in accordance with one embodiment of the present invention is presented. In an "AnyOf" policy, one parent license is all that is required for any number of child licenses. In FIG. 14, parent license 1300 includes attributes A (1305), B (1310) and C (1315). Thus, for each parent license 1300, any number of child licenses for A (1320), B (1325, 1330) and C (1335) may be granted.

Figure 15:
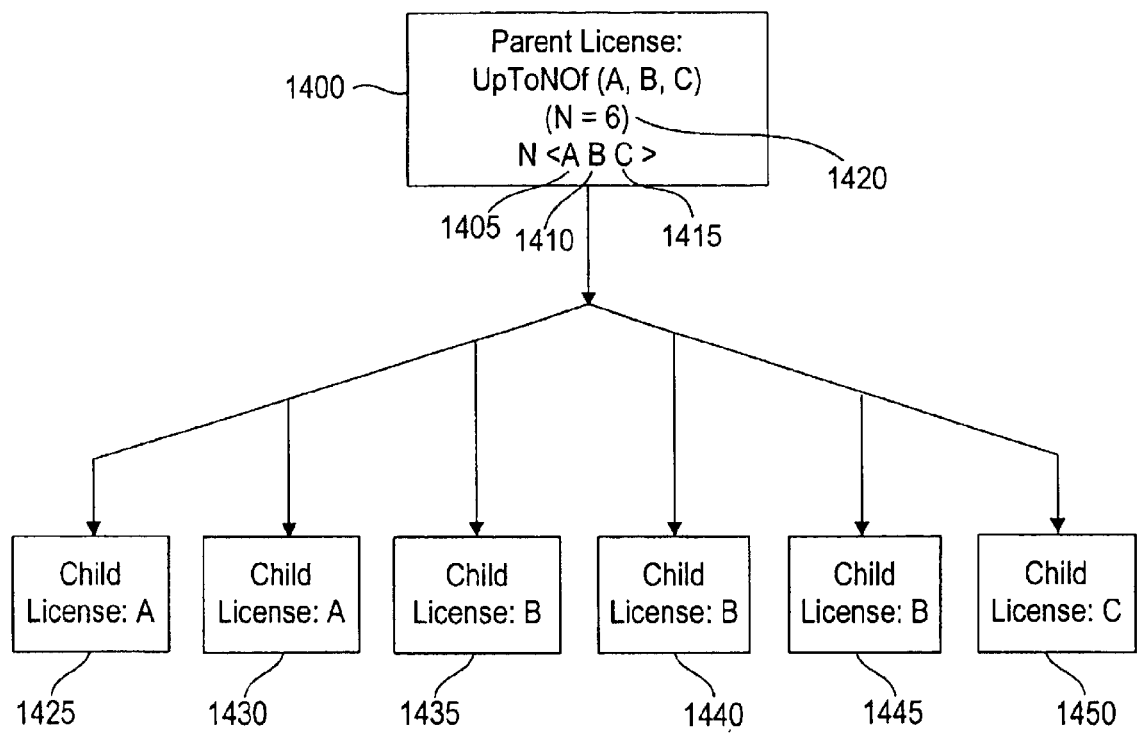
FIG. 15 is a block diagram that illustrates an "UpToN" policy in accordance with one embodiment of the present invention.

Turning now to FIG. 15, a block diagram that illustrates an "UpToN" policy in accordance with one embodiment of the present invention is presented. In an "UpToNof" policy, any number of child licenses up to a predetermined number may be granted per parent license. In FIG. 15, parent license 1400 includes attributes A (1405), B (1410) and C (1415), and the predetermined number is six 1420. Thus, for each parent license 1400, up to six child licenses (1425–1450) may be granted.

The discussion above regarding licensing policies is not intended to be limiting in any way. Those of ordinary skill in the art will recognize that other licensing policies are possible. Such other policies may include by way of example, combinations of the above policies.

Figure 16:
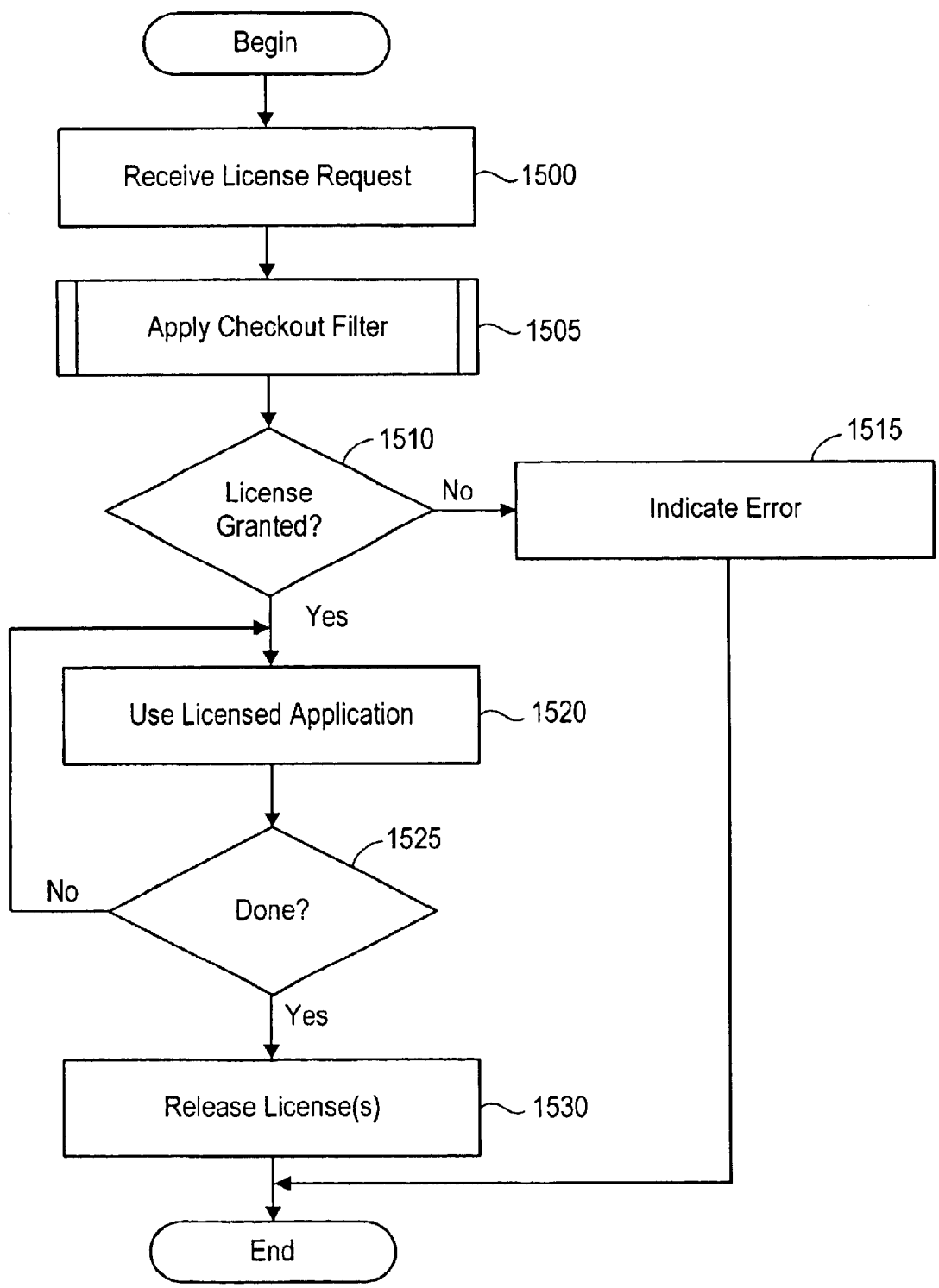
FIG. 16 is a flow diagram that illustrates a method for requesting a license in accordance with one embodiment of the present invention.

Turning now to FIG. 16, a flow diagram that illustrates a method for implementing a request for a license in accordance with one embodiment of the present invention is presented. This process can be implemented in software or hardware on the client computer system, or within a particular licensed program or product. The client computer system preferably includes standard components such as a microprocessor, RAM, ROM, input/output circuitry, a storage device, etc., as is well known to those skilled in the art.

Referring still to FIG. 16, at 1500, a license request is received. At 1505, a checkout filter is applied to the license request. At 1510, a determination is made regarding Whether the license has been granted. At 1515, an error is indicated when a license is not granted. At 1520 the license is used by the requesting entity. At 1525, a determination is made regarding whether the requesting entity has completed using the license. If the requesting entity no longer requires the license, at 1530, the license is released. If the requesting entity is still using the license, use of the license continues at 1520.

Preferably, licenses that have been checked out are returned to the pool of available licenses when the licenses are no longer in use. Returning a feature license may in turn make a package license available for use. Those of ordinary skill in the art will recognize that whether a feature license or a package license is returned to an available pool of licenses depends upon the particular licensing policies in use.

Figure 17:
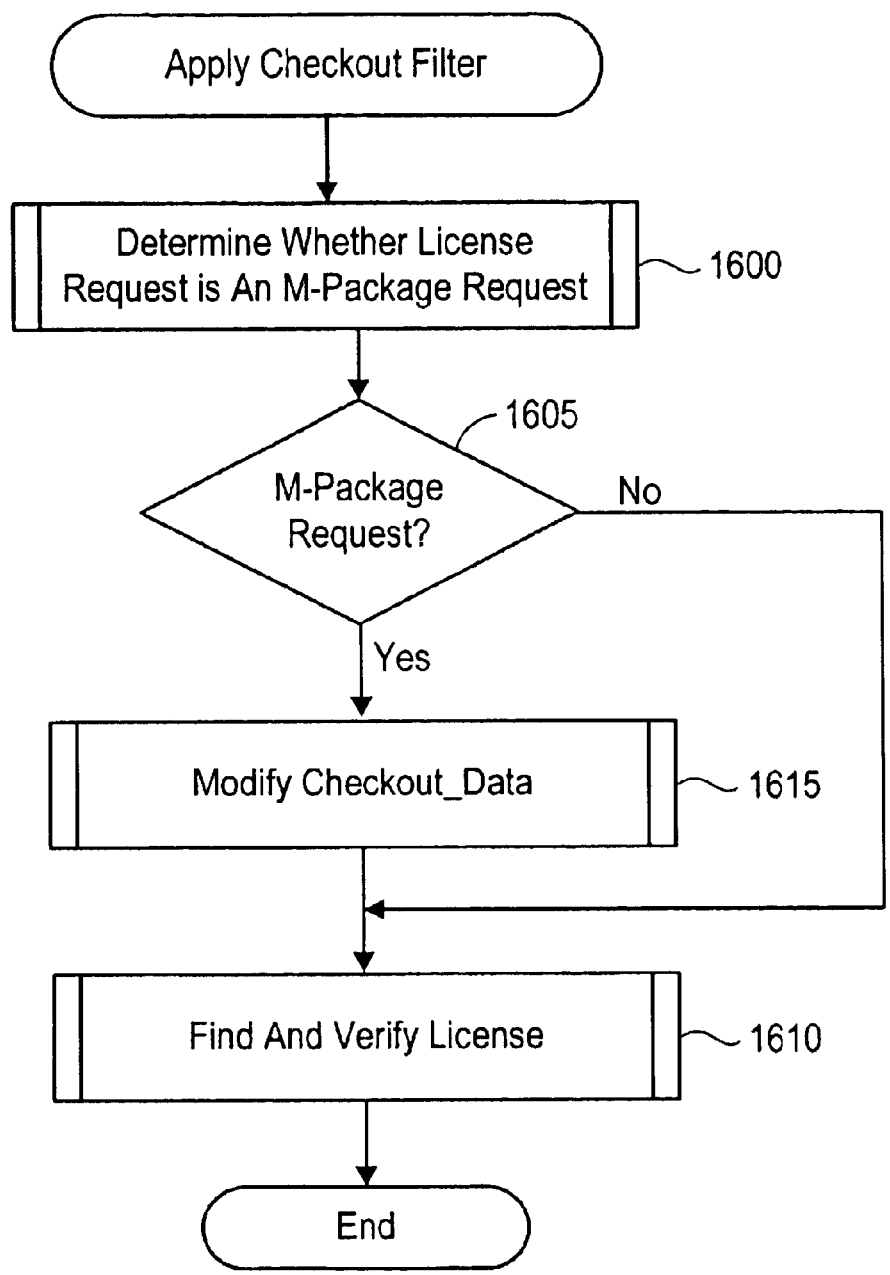
FIG. 17 is a flow diagram that illustrates a method for applying a checkout filter in accordance with one embodiment of the present invention.

Turning now to FIG. 17, a flow diagram that illustrates applying a checkout filter in accordance with one embodiment of the present invention is presented. FIG. 17 provides more detail with respect to reference numeral 1505 of FIG. 16. At 1600, a flag is set to indicate whether the license request is an M-Package request. At 1605, the flag set at 1600 is examined. If the license request is not an M-Package request, the license is found and verified at 1610. If the license request is an M-Package request, the checkout data is modified at 1615 and then the license is found and verified at 1610.

Figure 18:
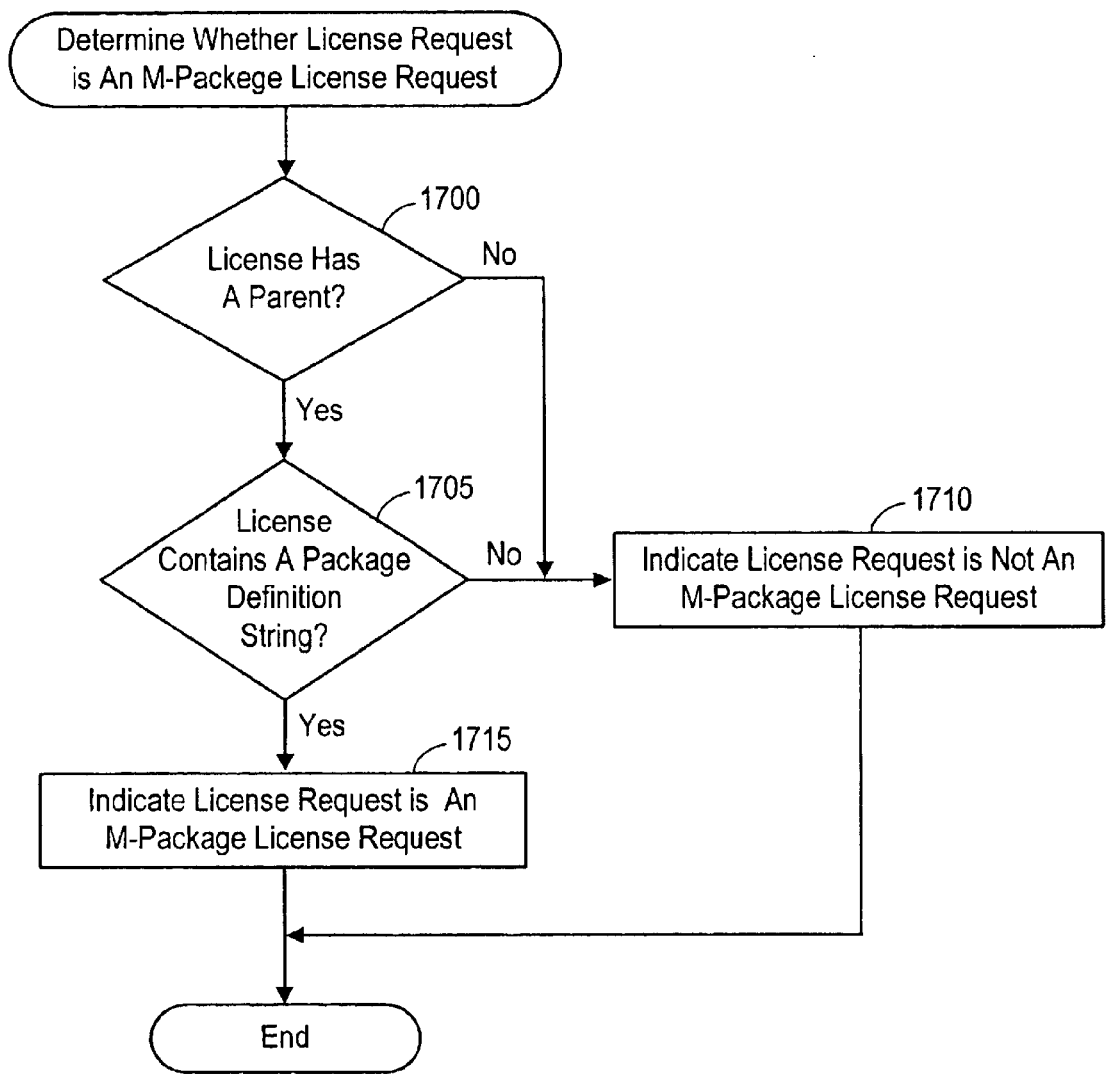
FIG. 18 is a flow diagram that illustrates a method for determining whether a license request is an M-Package license request in accordance with one embodiment of the present invention.

Turning now to FIG. 18, a flow diagram that illustrates determining whether a license request is an M-Package license request in accordance with one embodiment of the present invention is presented. FIG. 18 provides more detail with respect to reference numeral 1600 of FIG. 17. At 1700, a determination is made regarding whether the license has a parent. If the license has a parent, a determination is made regarding whether the license contains a package definition string at 1705. If the license does not have a parent, or if the license has a parent but does not contain a package definition string, at 1710, an indication is made that the license request is not an M-Package license request. If the license has a parent and the license contains a package definition string, an indication that the license is an M-Package license request is made at 1715.

Figure 19:
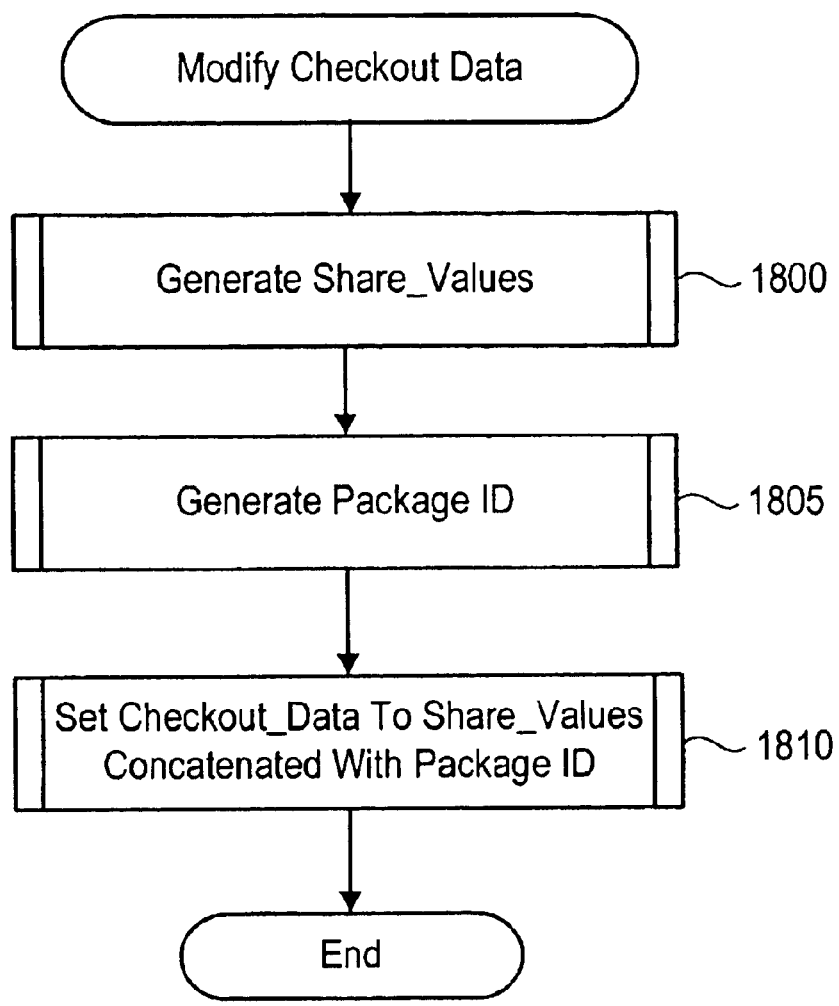
FIG. 19 is a flow diagram that illustrates a method for modifying checkout data in accordance with one embodiment of the present invention.

Turning now to FIG. 19, a flow diagram that illustrates modifying checkout data in accordance with one embodiment of the present invention is presented. FIG. 19 provides more detail with respect to reference numeral 1615 of FIG. 17. At 1800, share values are generated. At 1805, a package identifier is generated. At 1810, the checkout data value is set to the share values generated at 1800, concatenated with the package ID generated at 1805.

Figure 20:
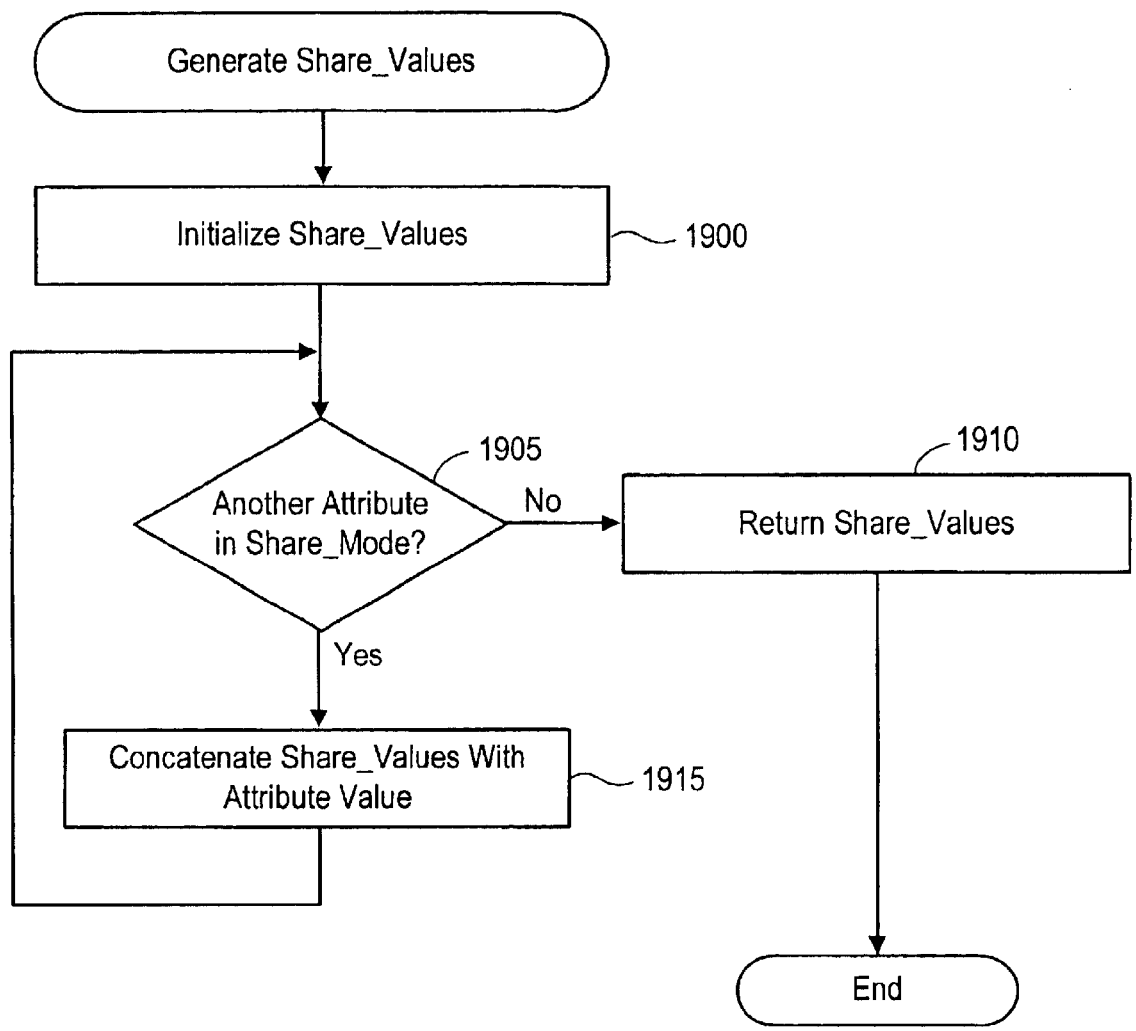
FIG. 20 is a flow diagram that illustrates a method for generating share values in accordance with one embodiment of the present invention.

Turning now to FIG. 20, a flow diagram that illustrates generating share values in accordance with one embodiment of the present invention is presented. FIG. 20 provides more detail with respect to reference numeral 1800 of FIG. 19. At 1900, share values are initialized. At 1905, a determination is made regarding whether there is another attribute in the share mode. If there are no more attributes in the share mode, at 1910, the generated share values are returned. If there is another attribute in the share mode, at 1915, the generated share values are concatenated with the attribute value.

Figure 21:
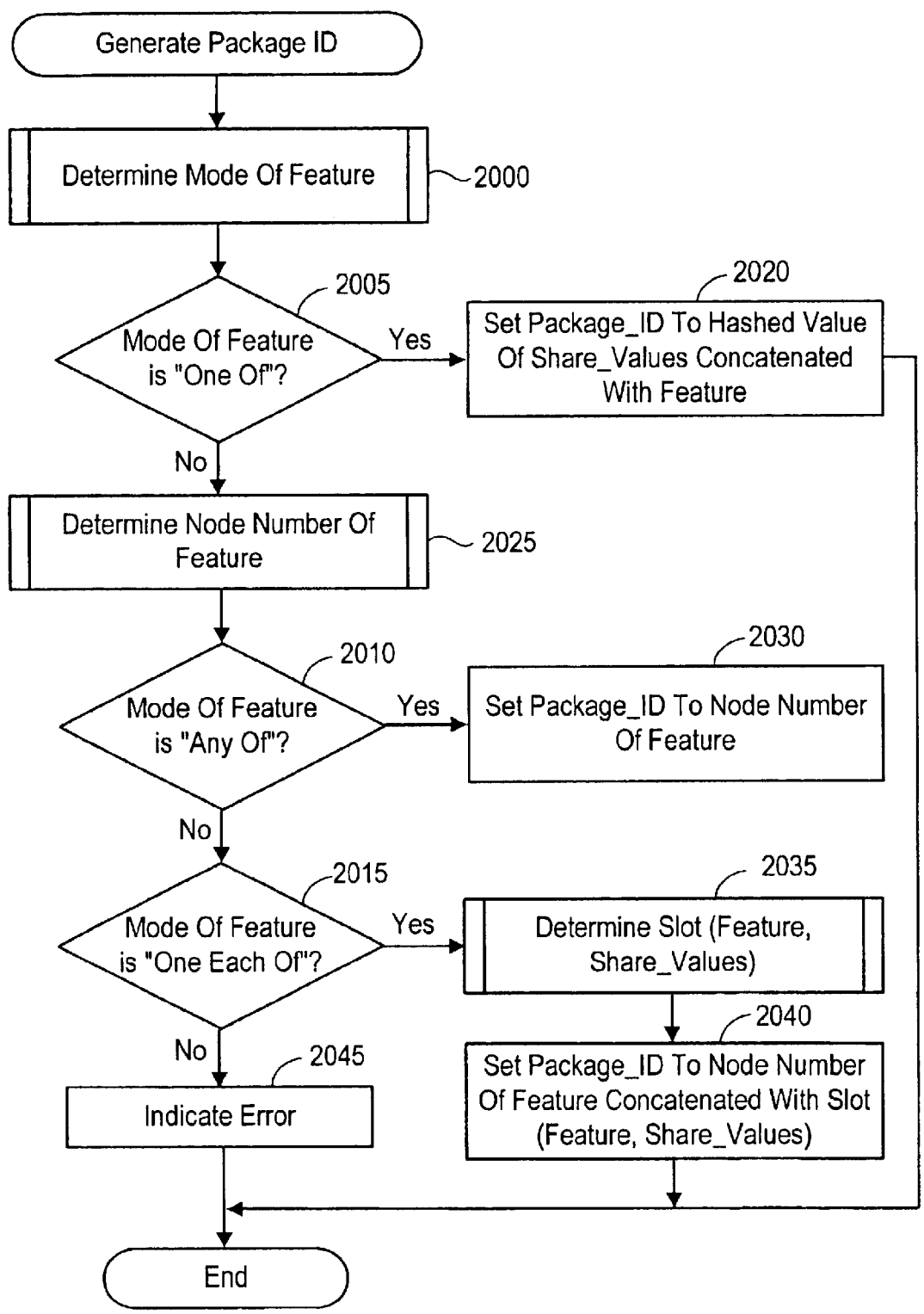
FIG. 21 is a flow diagram that illustrates a method for generating a package identifier in accordance with one embodiment of the present invention.

Turning now to FIG. 21, a flow diagram that illustrates generating a package identifier in accordance with one embodiment of the present invention is presented. FIG. 21 provides more detail with respect to reference numeral 1805 of FIG. 19. At 2000, a flag is set to indicate the feature mode. At 2005, 2010 and 2015, the flag set at 2000 is checked to see whether the feature mode is "One Of", "Any Of" or "One Each Of", respectively. If the feature mode is "One Of", at 2020, the package ID is set to the hashed value of share values, concatenated with the feature ID. If the feature mode is not "One Of", at 2025, the node number of the feature is determined. If the feature mode is "Any Of", at 2030, the package ID is set to the node number of the feature. If the feature mode is "One Each Of", the slot ID indicated by the feature and share values is determined at 2035 and the package ID is set to the node number of the feature, concatenated with the slot ID indicated by the feature and share values at 2040. One slot is available for each "One Each Of" grouping. For example, a request for two instances of the same feature within the same "One Each Of" grouping requires two slots and thus two package licenses. At 2045, an error is indicated if the feature mode is not recognized.

Figure 22:
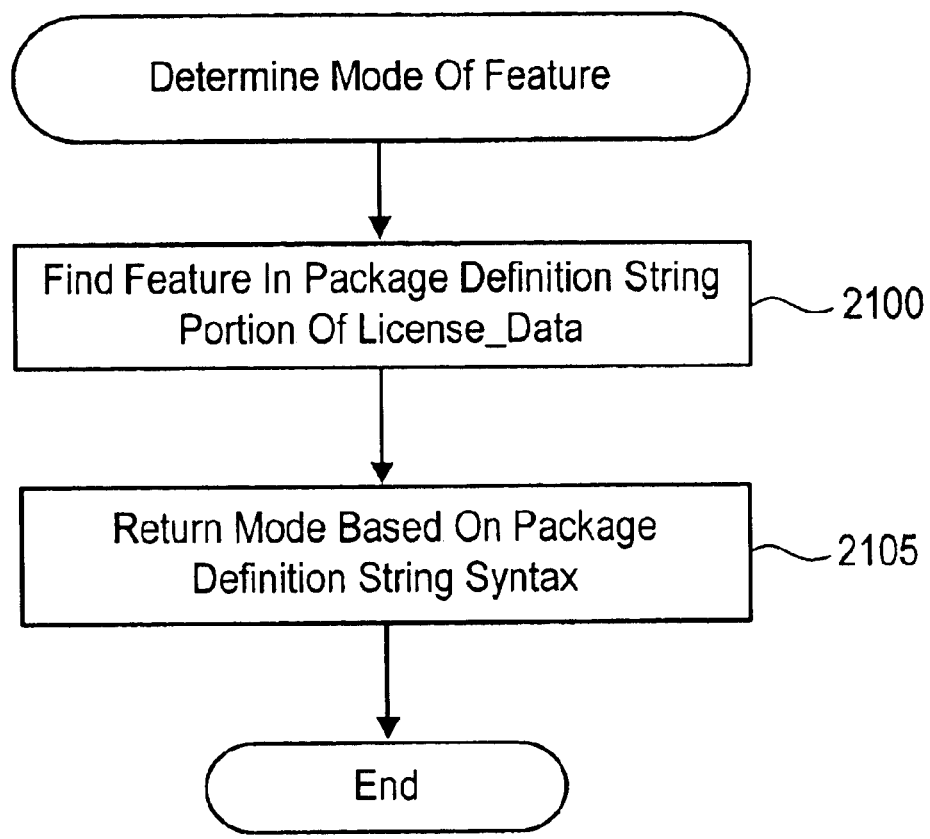
FIG. 22 is a flow diagram that illustrates a method for determining a feature mode in accordance with one embodiment of the present invention.

Turning now to FIG. 22, a method for determining a feature mode in accordance with one embodiment of the present invention is presented. FIG. 22 provides more detail with respect to reference numeral 2000 of FIG. 21. At 2100, the feature is found in the package definition string portion of License Data. At 2105, the mode is returned, depending upon package definition string syntax. Using the example illustrated by FIG. 13, the mode of feature "B" in the package definition string "(A B C)" is "OneEachOf".

Figure 23:
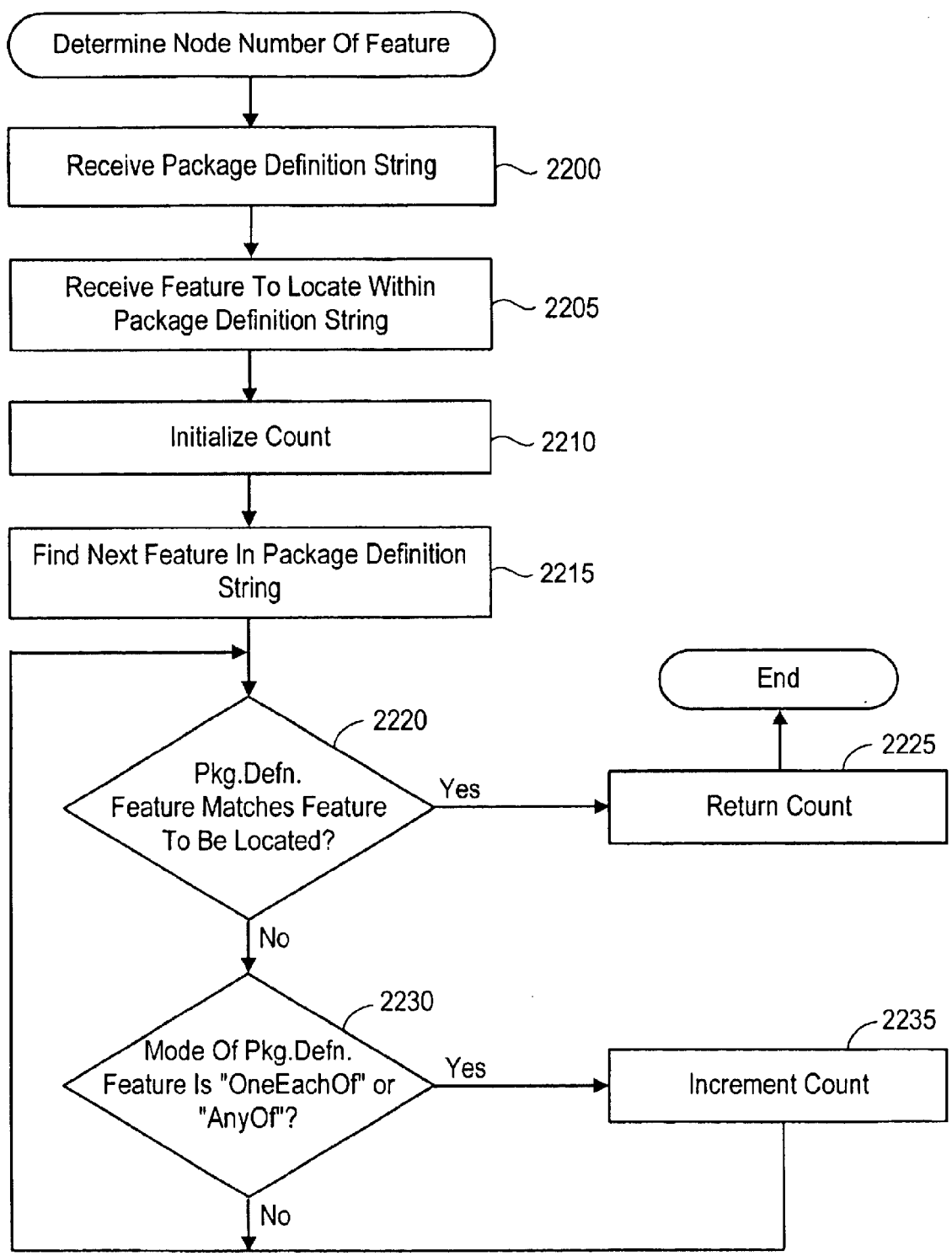
FIG. 23 is a flow diagram that illustrates a method for the node number of a feature in accordance with one embodiment of the present invention.

Turning now to FIG. 23, a flow diagram that illustrates determining the node number of a feature in accordance with one embodiment of the present invention is presented. FIG. 23 provides more detail with respect to reference numeral 2025 of FIG. 21. At 2200, the package definition string is received. At 2205, the feature to be located within the package definition string is received. At 2210, a count is initialized to a value that represents the location of the first feature in the package definition string. At 2215, the next package definition string feature is found in the package definition string. At 2220, a determination is made regarding whether the current package definition string feature matches the feature to be located. If the current package definition string feature matches the feature to be located, at 2225, the current count is returned. If the current package definition string feature does not match the feature to be located, at 2230, a determination is made regarding whether the mode of the current package definition string feature is "One Each Of" or "Any Of". If the mode of the current package definition string feature is "One Each Of" or "Any Of", the count is incremented at 2235. This process continues at 2220 until the current package definition string feature matches the feature to be located.

Figure 24:
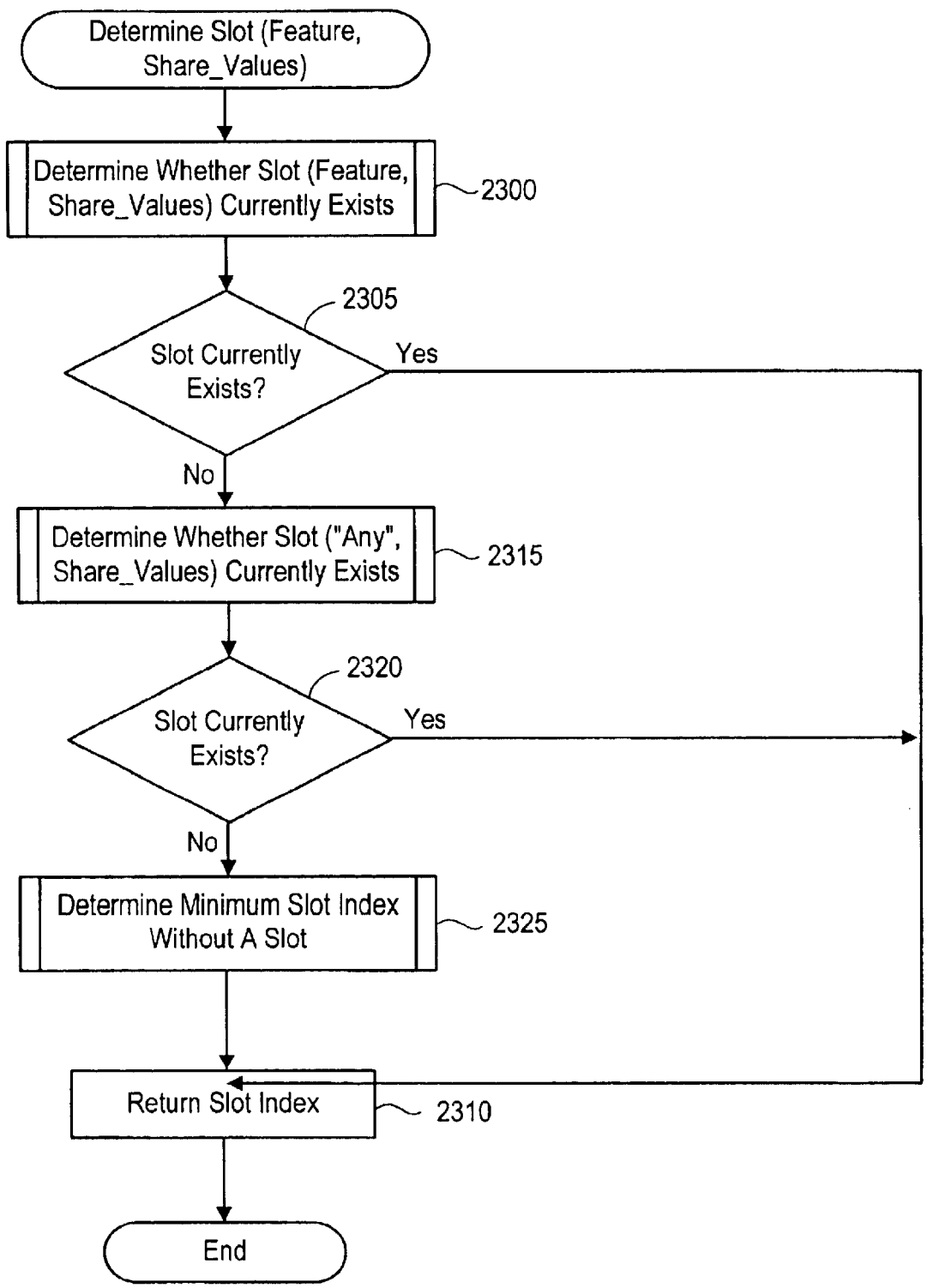
FIG. 24 is a flow diagram that illustrates a method for determining the slot indicated by the combination of a feature and a share value in accordance with one embodiment of the present invention.

Turning now to FIG. 24, a flow diagram that illustrates determining the slot indicated by the combination of a feature and share value in accordance with one embodiment of the present invention is presented. At 2300, a flag is set to indicate whether a slot for the combination currently exists. At 2305, the flag set at 2300 is examined. If the slot currently exists, the slot index is returned at 2310. If the slot does not exist, a flag is set a 2315 to indicate whether a slot for any combination having any feature and the same share values currently exists. If such a slot currently exists, the slot index is returned at 2310. If the slot does not currently exist, at 2325, the minimum slot index without an index is determined. The slot index is returned at 2310.

Figure 25:
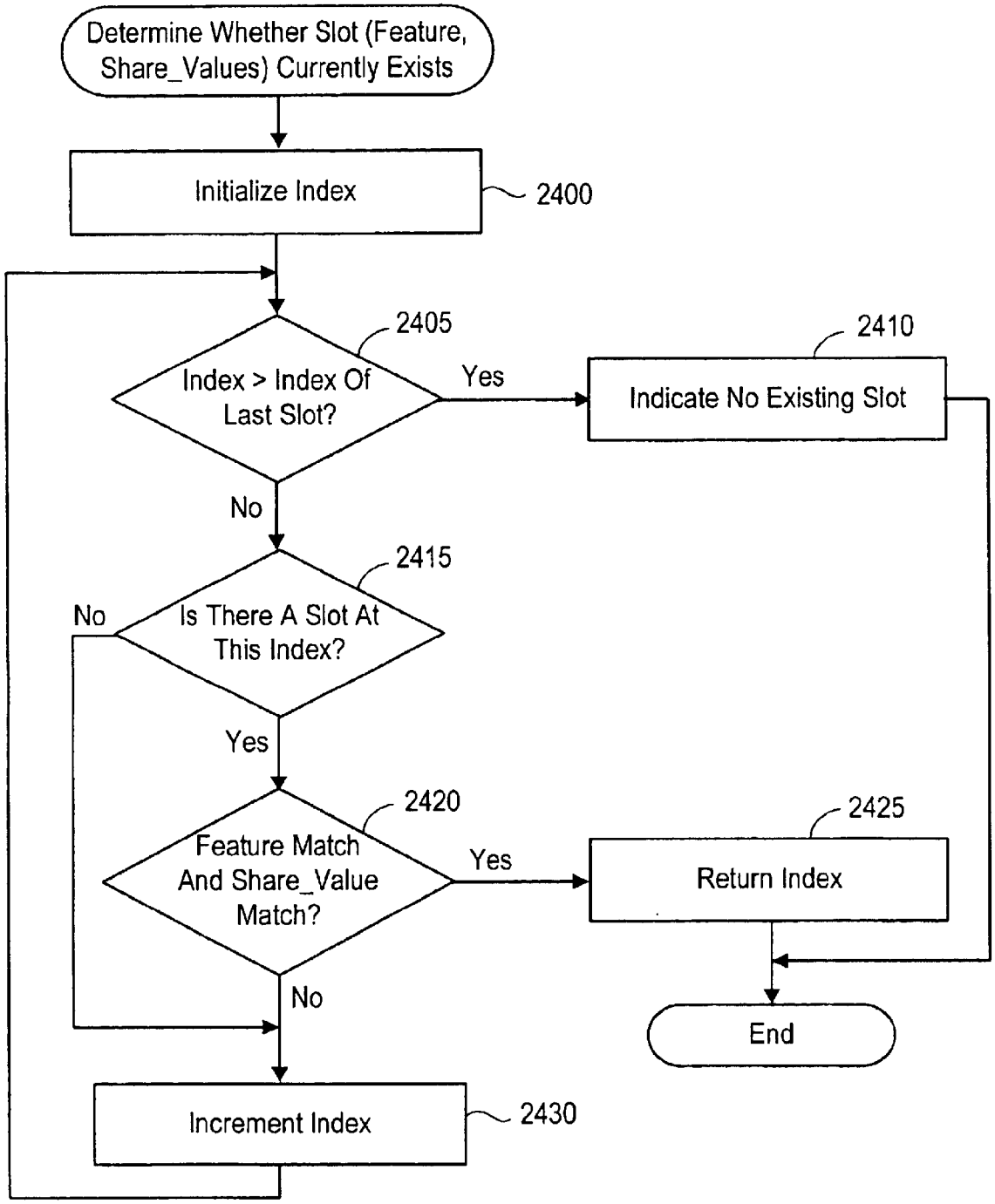
FIG. 25 is a flow diagram that illustrates a method for determining whether a slot indicated by the combination of a feature and share values currently exists in accordance with one embodiment of the present invention.

Turning now to FIG. 25, a flow diagram that illustrates determining whether a slot indicated by a feature and share values combination currently exists in accordance with one embodiment of the present invention is presented. At 2400, an index is initialized. At 2405, a determination is made regarding whether the index is greater than the index of the last slot. If the index is greater than the index of the last slot, at 2410, an indication that there is no slot is made. If the index is not greater than the index of the last slot, a 2415, a determination is made regarding whether there is a slot at the location indicated by the index. If there is a slot at the location indicated by the index, at 2420, a determination is made regarding whether the feature to be located and the share mode to be located match the feature and share mode at the location indicated by the index. If there is both a feature match and a share mode match, at 2425, the index is returned. If there is no slot at the location indicated by the index, or if there is a slot at the location indicated by the index but there is either no feature match or no share values match, the index is incremented at 2430. This process continues at 2405 until all slots have been checked, or until a feature match and a share value match is found.

Figure 26:
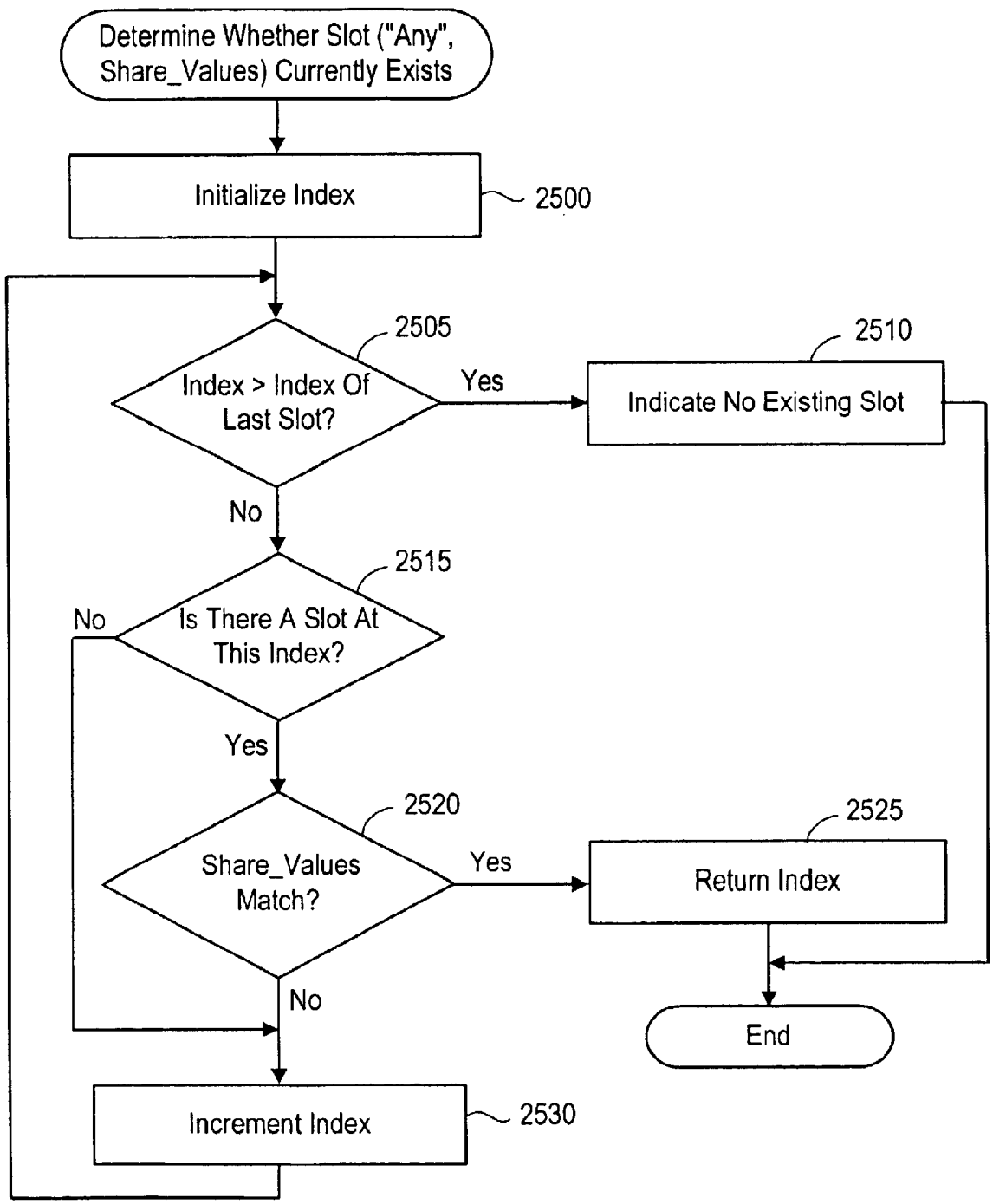
FIG. 26 is a flow diagram that illustrates a method for determining whether a slot indicated by the combination of any feature and share values in accordance with one embodiment of the present invention.

Turning now to FIG. 26, a flow diagram that illustrates determining whether a slot indicated by the combination of any feature and a share values currently exists in accordance with one embodiment of the present invention is presented. At 2500, an index is initialized. At 2505, a determination is made regarding whether the index is greater than the index of the last slot. If the index is greater than the index of the last slot, an indication that there is no slot is made at 2510. If the index is not greater than the index of the last slot, at 2515, a determination is made regarding whether there is a slot at the location indicated by the current index. If there is a slot at the location indicated by the current index, at 2520, a determination is made regarding whether there is a match between the share values to be located and the share values in the location indicated by the current index. If the share values match, at 2525, the current index is returned. If there is no slot at the location indicated by the current index or if there is a slot at the location indicated by the current index but the share values do not match, the index is incremented at 2530 and execution continues at 2505.

Figure 27:
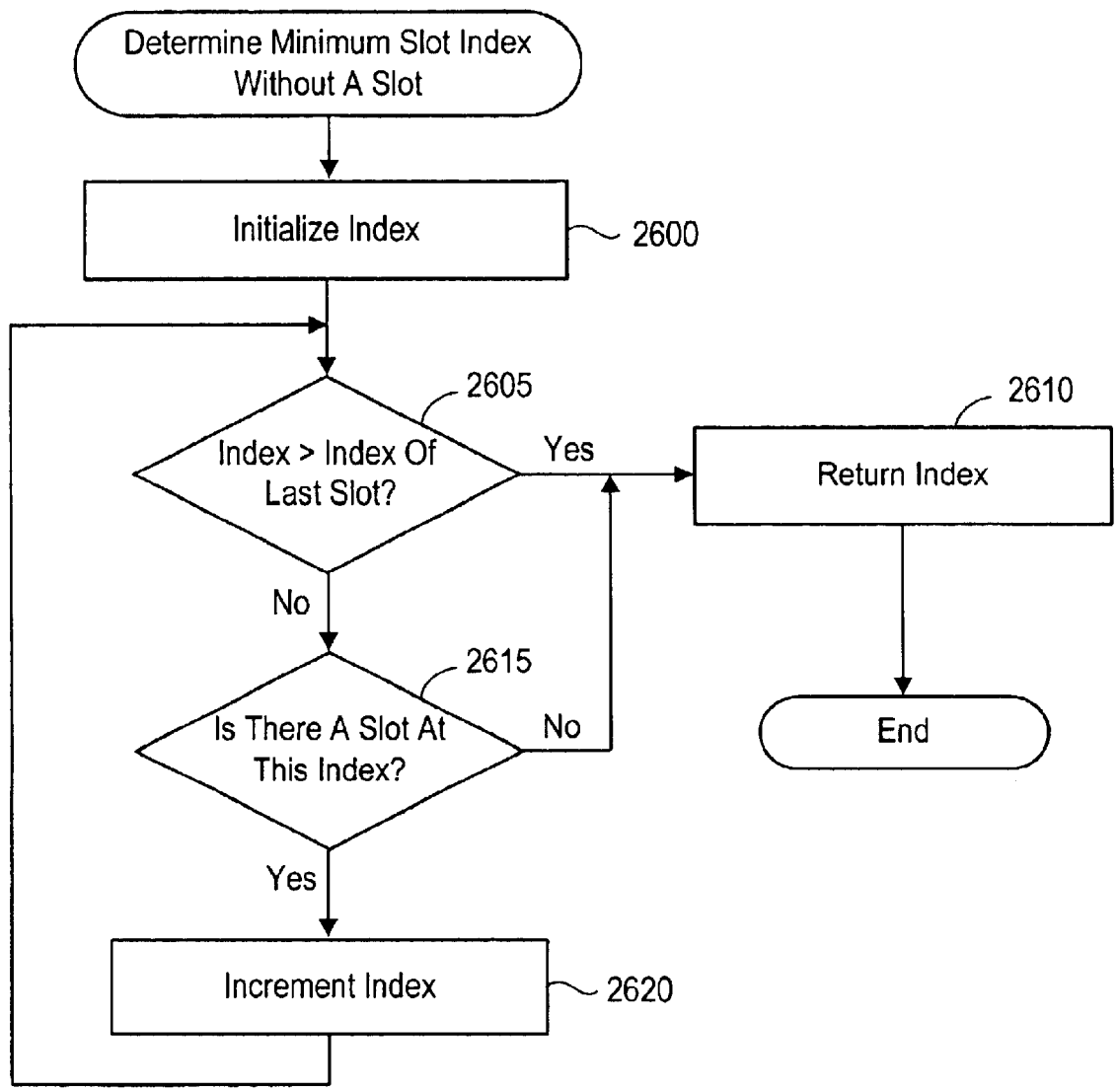
FIG. 27 is a flow diagram that illustrates a method for determining a minimum slot index without a slot in accordance with one embodiment of the present invention.

Turning now to FIG. 27, a flow diagram that illustrates determining a minimum slot index without a slot in accordance with one embodiment of the present invention is presented. At 2600, an index is initialized. At 2605, a determination is made regarding whether the index is greater than the index of the last slot. If the index is greater than the index of the last slot, at 2610, the index is returned. If the index is not greater than the index of the last slot, at 2615, a determination is made regarding whether there is a slot at the location indicated by the current index. If there is no slot at the location indicated by the current index, the current index is returned at 2610.

Figure 28:
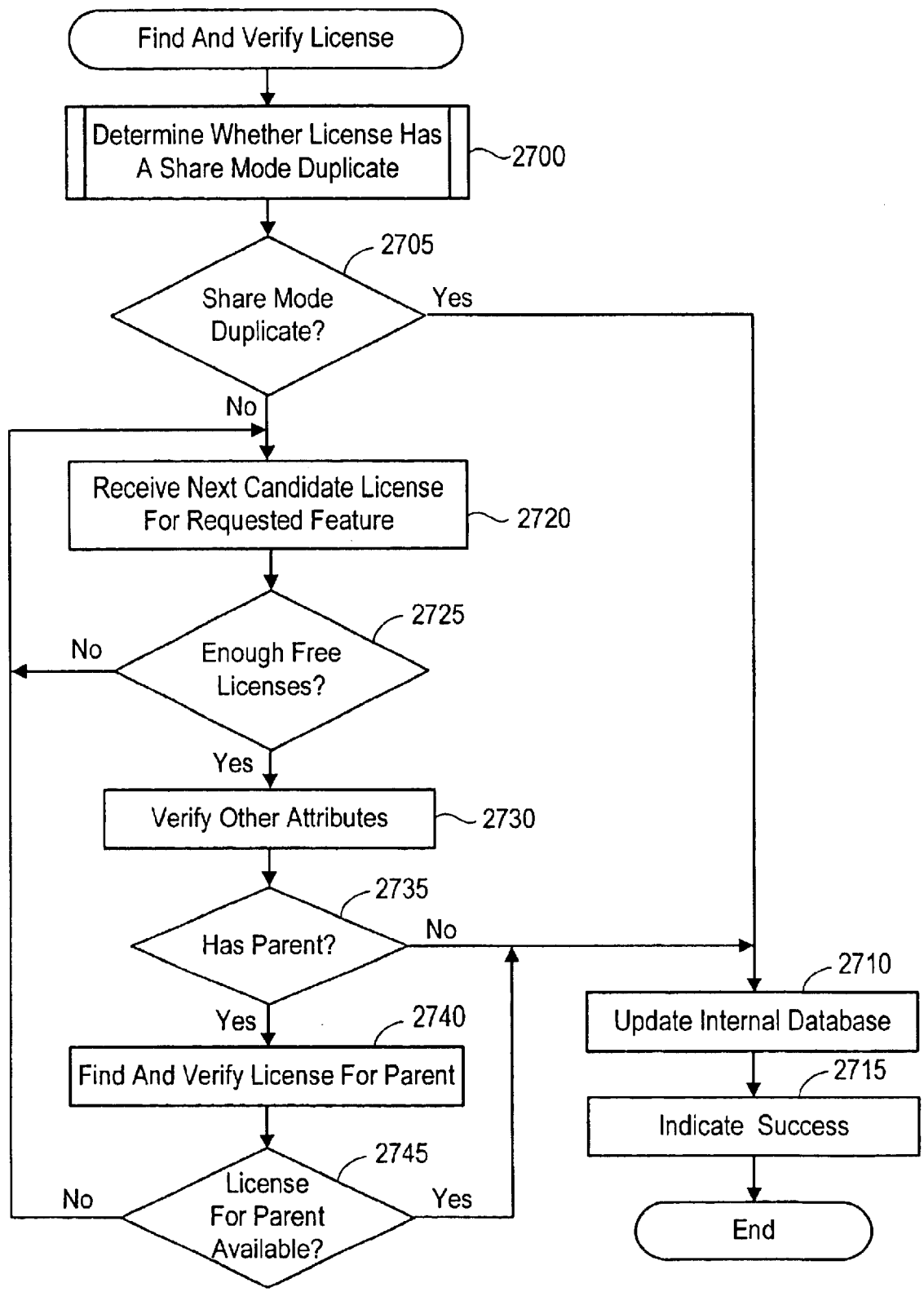
FIG. 28 is a flow diagram that illustrates a method for finding and verifying licenses in accordance with one embodiment of the present invention.

Turning now to FIG. 28, a flow diagram that illustrates finding and verifying licenses in accordance with one embodiment of the present invention is presented. FIG. 28 provides more detail with respect to reference numeral 1610 of FIG. 17. At 2700, a flag is set to indicate whether the license has a share mode duplicate. At 2705, the flag set at 2700 is checked. If there is a share mode duplicate, the internal database is updated at 2710 and success is indicated at 2715. If there is no share mode duplicate, at 2720, the next candidate license for the requested feature is received. At 2725, a determination is made regarding whether there are enough free licenses. If there are not enough free licenses, the next candidate license is received at 2720. If there are enough free licenses, at 2730, other attributes are verified. At 2735, a determination is made regarding whether the candidate license has a parent license. If the candidate license is not associated with a parent license, the internal database is updated at 2710 and success is indicated at 2715. If the candidate license has a parent license, the parent license is found and verified at 2740. At 2745, a determination is made regarding whether the parent license is available. If the parent license is available, the internal database is updated at 2710 and success is indicated at 2745. If the parent license is not available, the next candidate license for the requested feature is received at 2720. This process continues until either a verified license is found or until all candidate licenses have been examined.

Figure 29:
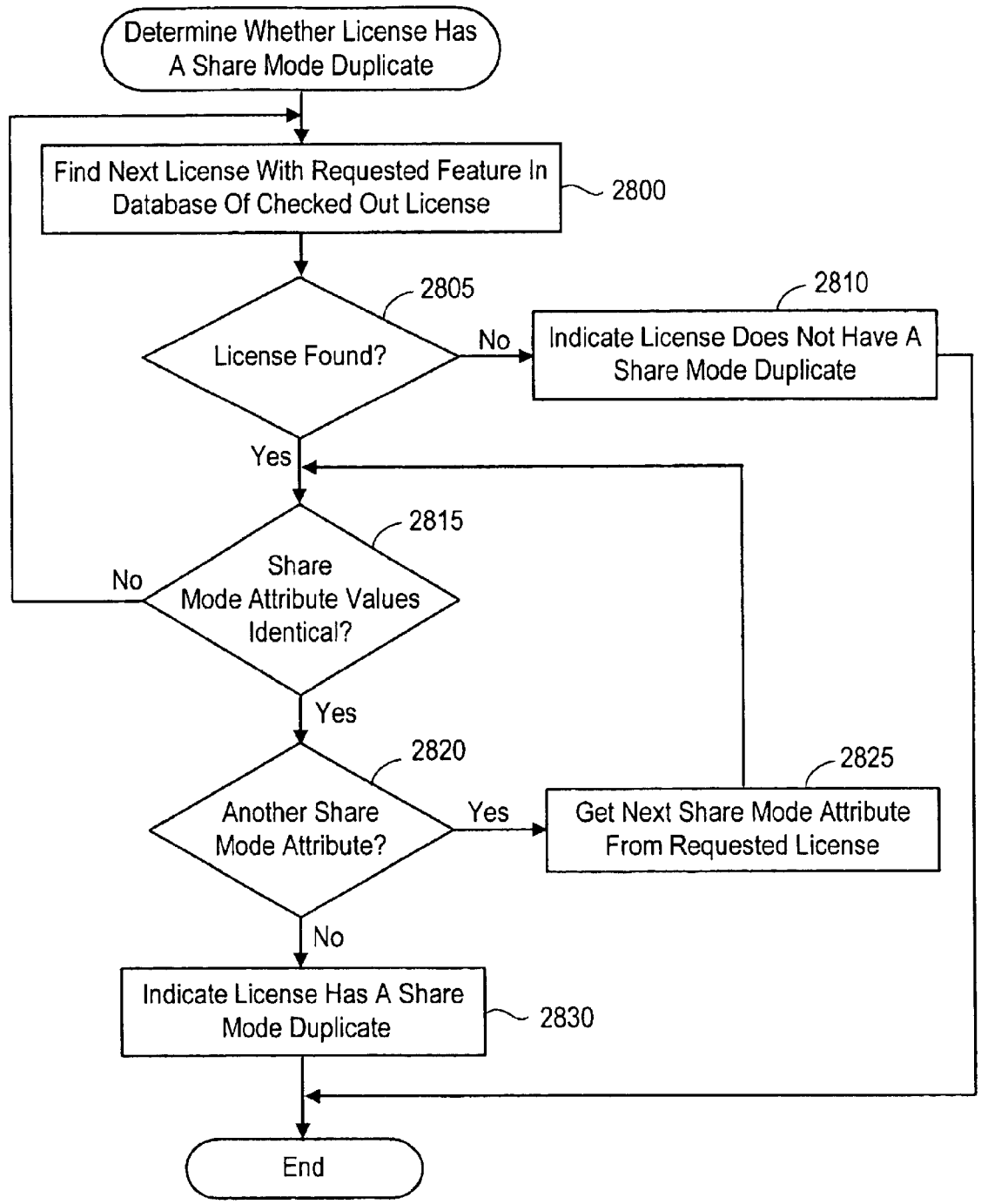
FIG. 29 is a flow diagram that illustrates a method for determining whether a license has a share mode duplicate in accordance with one embodiment of the present invention.

Turning now to FIG. 29, a flow diagram that illustrates determining whether a license has a share mode duplicate in accordance with one embodiment of the present invention is presented. FIG. 29 provides more detail with respect to reference numeral 2700 of FIG. 28. At 2800, the next license with the requested feature is searched for within a database of checked out licenses. At 2805, a determination is made regarding whether a license with the requested feature was found. If a license with the requested feature is not found, at 2810, an indication that the license does not have a share mode duplicate is made. If a license with the requested feature is found, at 2815, a determination is made regarding whether the share mode attribute values are identical. If the share mode attributes are not identical, another license with the requested feature is searched for at 2800. If the share mode attributes are identical, a determination is made regarding whether there is another share mode attribute at 2820. If there is another share mode attribute, the next share mode attribute is obtained from the requested license at 2825. If there is not another share mode attribute, an indication that the license has a share mode duplicate is made at 2830.

Examples of license checkouts performed according to embodiments of the present invention are illustrated below with reference to FIGS. 30–32.

Figure 30:
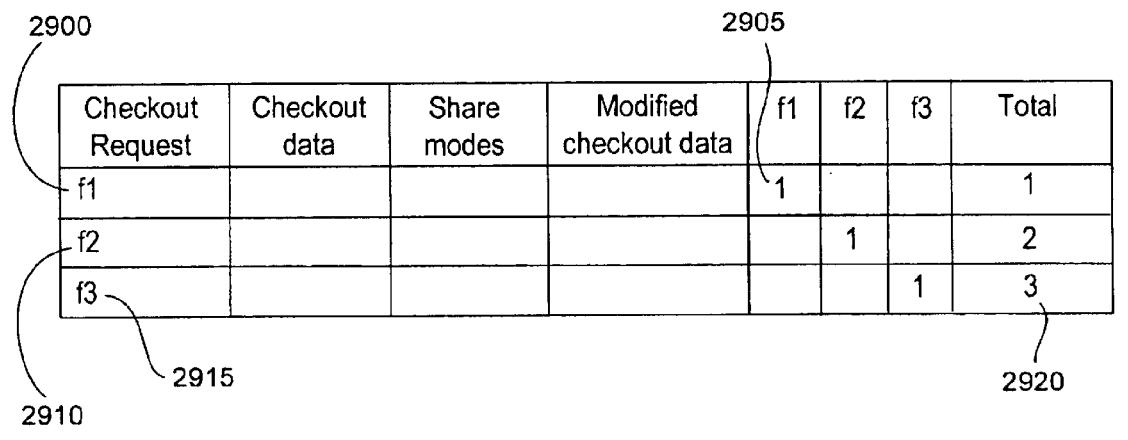

Turning now to FIG. 30, a table that illustrates performing several license checkouts with a non-M-package license in accordance with one embodiment of the present invention is presented. A checkout request for feature f3 (2900) uses one feature license 2905. The second checkout request is for feature f2 (2910) and the third checkout request is for feature f3 (2905). Each checkout request uses an additional feature license. Hence, the checkout of features f1 (2900), f2 (2910) and f3 (2915) results in a total of three (2920) feature licenses and zero package licenses.

Turning now to FIG. 31, a table that illustrates performing a license checkout with an M-Package license in accordance with one embodiment of the present invention is presented. The package definition string for this example is "{f1 (f2 f3)}". The first checkout request is for feature f1 (3000). At reference numeral 1810 of FIG. 19, the M-package filter modifies the original checkout data by concatenating the share modes value with a package identifier. The colon ":" symbol is used herein to indicate concatenation. Since the share modes value is blank, the modified checkout data is set to the package identifier. Based on the syntax of the package definition string, the mode of feature f1 (3000) is "one of". Thus, at reference numeral 2020 of FIG. 21, the package ID is set to the hashed value of share values, concatenated with the feature ID. Since the value of share values is blank, the package ID is set to the feature ID.

The second checkout request is for feature f2 (3005). The M-package filter modifies the checkout data by concatenating the share modes value with a package identifier. Based on the syntax of the package definition string, the mode of feature f2 (3005) is "OneEachOf". Thus, at reference numeral 2040 of FIG. 21, the package ID is set to the node number of feature f2 (3005), concatenated with the slot for feature f2 (3005) and its associated share values. As shown in FIG. 31, the node number of feature f2 (3005) is 2 (3010). At reference numeral 2325 of FIG. 24, the slot does not exist, so slot number 0 is assigned. The modified checkout data is thus 2:0, or the value 2, concatenated with the value 0.

The third checkout request is for feature f3. The M-package filter modifies the checkout data by concatenating the node number of feature f3 (3015) with the slot identifier for feature f3 (3015). Since the modified checkout data for the checkouts of f2 (3020) and f3 (3025) are the same, both checkouts share the same M-package license.

The fourth checkout request is for feature f2 (3030) again. Since the mode of f2 (3030) is "OneEachOf", another package license is required. Ensuring that the checkout data for the first feature 2 checkout (3005) and the second feature 2 checkout (3030) are different enforces this requirement. In this example, the slot number increased with the second checkout of feature f2 (3030). Since the checkout data is different, the second checkout of feature f2 (3030) requires another M-Package license.

Checkout requests 3035, 3040 and 3045 are for features that have an "AnyOf" mode. At reference numeral 2030 of FIG. 21, the modified checkout data for each of 3035, 3040 and 3045 is set to the node number. Features f4 (3035, 3045) and f5 (3040) share the same node number (the number three), so the modified checkout data for checkouts 3035, 3040 and 3045 are the same and the three checkouts require a single M-Package license.

Turning now to FIG. 32, a table that illustrates performing a license checkout with an M-Package license in accordance with one embodiment of the present invention is presented. FIG. 32 is similar to FIG. 31, except that checkout requests 3100, 3105 and 3110 include checkout data values (3115, 3120, 3125) and a share modes value of checkout data (3130, 3135, 3140). Furthermore, the checkout data for f1 (3115) and f2 (3120) differs from that of f3 (3125). The share modes values (3145, 3120, 3125) are appended to the beginning of modified checkout data (3145, 3150, 3155). Note that the additional value added to the modified checkout data for feature f3 (3160) makes the checkout data for f2 (3150) and f3 (3155) different, thus requiring separate M-Package licenses.

Although only one embodiment of the present invention has been described in detail, it should be understood that the present invention may be embodied in many other specific forms without departing from the spirit or scope of the invention. Particularly, the license management system configuration described can be adapted to a wide variety of network layers and configurations. In addition, the license server functions can be provided by a single computer system or several different systems, and can even be incorporated into a client computer system. Further, the types of requesters can be widely varied, from personal computer systems, terminals, other servers, or any CPU-based computer. The embodiment described contemplates an internal license database; however, those of ordinary skill in the art will recognize that license data can be stored in a variety of locations and devices.

The block diagrams and flowcharts described herein are illustrative of merely the broad architectures and logical flow of steps to achieve a method of the present invention and that steps may be added to, or taken away from, a flowchart without departing from the scope of the invention. Further, the order of execution of steps in the flowcharts may be changed without departing from the scope of the invention. Additional considerations in implementing the method described by a flowchart may dictate changes in the selection and order of steps.

In general, the flowcharts in this specification include one or more steps performed by software routines executing in a computer system. The routines may be implemented by any means known in the art. For example, any number of computer programming languages, such as the Java™ language, C, C++, Pascal, Smalltalk, FORTRAN, assembly language, etc., may be used. Further, various programming approaches such as procedural, object oriented or artificial intelligence techniques may be employed. It should be noted, however, that the platform independent code should be written in a programming language especially suitable for platform independent applications, such as the Java™ language or Smalltalk. As known to those skilled in the art, the program code corresponding to implement aspects of the present invention may all be stored on a computer-readable medium. Depending on each particular implementation, computer-readable media suitable for this purpose may include, without limitation, floppy diskettes, hard drives, network drives, RAM, ROM, EEPROM, nonvolatile RAM, or flash memory.

According to a presently preferred embodiment, the presently claimed invention may be implemented in software or firmware, as well as in programmable gate array devices, Application Specific Integrated Circuits (ASICs), and other hardware.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for providing licenses to client computer systems to allow said client computer systems to use licensed software products, the method comprising:

receiving a request for a feature license for a feature included in a package, said request being received from a client computer system that wishes to use said feature, said request optionally including checkout data, said checkout data including at least one desired feature attribute;

filtering said request based on whether said license requires the checkout of a parent license;

granting a package license to said client computer system when said client computer system is allowed to receive said package license according to a license policy, said package license being associated with said package that includes said requested feature, said package license allowing said client computer system to use said requested feature product; and denying said package license to said client computer system when said client computer system is not allowed to receive said package license according to said license policy, wherein said filtering further comprises:

modifying said checkout data when said license requires the checkout of a parent license;

locating said license within a license database; and verifying said license.

2. The method of claim 1 wherein said determining whether said license requires the checkout of a parent license further comprises:

indicating said license request does not require the checkout of a parent license when said license is not associated with a parent license;

indicating said license request does not require the checkout of a parent license when said license does not include a package definition string; and indicating said license request requires the checkout of a parent license when said license has a parent and said license contains a package definition string.

3. The method of claim 1 wherein said modifying checkout data further comprises:

generating share values;

generating a package ID; and setting a modified checkout data value to said share values concatenated with said package ID.

4. The method of claim 3 wherein said generating share values further comprises returning a character string that includes each attribute in said share mode.

5. The method of claim 3 wherein said generating a package ID further comprises:

determining the mode of said feature;

setting said package ID to the hashed value of said share values concatenated with said feature when said mode of said feature is "One Of";

setting said package ID to the node number of said feature when said mode of said feature is "Any Of", said node number based on a number assigned to said feature within a tree representation of said package definition string; and setting said package ID to the node number of said feature, concatenated with a slot indicated by the combination of said feature and said share values when said mode of said feature is "One Each Of".

6. The method of claim 5 wherein said determining the mode of said feature further comprises:

finding said feature in the package definition string portion of said license data; and returning the mode of said feature based upon the syntax of said package definition string.

7. The method of claim 5 wherein said determining the node number of said feature further comprises:

receiving a package definition string;

receiving a feature to be located in said package definition string;

initializing a count;

finding the next feature in said package definition string;

returning said count when said package definition feature matches said feature to be located; and incrementing said count when said mode of said package definition feature is "One Each Of" or "Any Of".

8. The method of claim 5 wherein said determining the slot indicated by the combination of said feature and share values further comprises:

determining whether a slot indicated by the combination of any feature and said share values currently exists when said slot indicated by the combination of said feature and share values does not exist;

returning said slot index when said slot indicated by the combination of said feature and share values exists; and determining a minimum slot index without a slot when said slot does not exist.

9. The method of claim 8 wherein said determining whether a slot indicated by the combination of said feature and said share values exists further comprises:

initializing an index;

indicating there is no slot when said index is greater than the index of a last slot;

incrementing said index when there is a slot at said index and said features and share values do not match; and returning said index when there is a slot at said index and said feature and said share values match.

10. The method of claim 8 wherein said determining whether a slot indicated by the combination of any feature and said share values exists further comprises:

initializing an index;

indicating there is no slot when said index is greater than the index of a last slot;

incrementing said index when there is a slot at said index and said share values do not match; and returning said index when there is a slot at said index and said share values match.

11. The method of claim 8 wherein said determining the minimum slot index without a slot further comprises:
   initializing an index;
   returning said index when said index is greater than the index of the last slot; and
   incrementing said index when said index is not greater than the index of the last slot and when there is a slot at said index.

12. The method of claim 1 wherein said locating and said verifying further comprises:
   updating said internal database and indicating success when said license has a share mode duplicate;
   receiving a candidate license for said requested feature when said license has no share mode duplicate;
   verifying other attributes;
   finding and verifying a parent license of said license;
   updating said internal database and indicating success when said parent license is available; and
   receiving the next candidate license when said parent license is not available.

13. The method of claim 12 wherein said determining whether said license has a share mode duplicate further comprises:
   finding the next license with the requested feature in a database of checked out licenses;
   indicating said license does not have a share mode duplicate when said license is not found; and
   indicating said license has a share mode duplicate when said share mode attribute values are identical and when there are no more share mode attributes.

14. A software license server suitable for use in conjunction with a computer system and operative to provide licenses to said computer system to allow said computer system to use licensed software programs, the license server comprising:
   a database for storing a plurality of feature licenses and package licenses;
   means for receiving a request for a feature license for a feature included in a package, said request being received from a client computer system that wishes to use said feature, said request optionally including checkout data, said checkout data including at least one desired feature attribute;
   means for filtering said request based on whether said license requires the checkout of a parent license;
   means for granting a package license to said client computer system when said client computer system is allowed to receive said package license according to a license policy, said package license being associated with said package that includes said requested feature, said package license allowing said client computer system to use said requested feature product; and
   means for denying said package license to said client computer system when said client computer system is not allowed to receive said package license according to said license policy,
   wherein said means for filtering further comprises:
   means for modifying said checkout data when said license requires the checkout of a parent license;
   means for locating said license within a license database; and
   means for verifying said license.

15. The software license server of claim 14 wherein said means for determining whether said license requires the checkout of a parent license further comprises:
   means for indicating said license request does not require the checkout of a parent license when said license is not associated with a parent license;
   means for indicating said license request does not require the checkout of a parent license when said license does not include a package definition string; and
   means for indicating said license request requires the checkout of a parent license when said license has a parent and said license contains a package definition string.

16. The software license server of claim 14 wherein said means for modifying checkout data further comprises:
   means for generating share values;
   means for generating a package ID; and
   means for setting a modified checkout data value to said share values concatenated with said package ID.

17. The software license server of claim 16 wherein said means for generating share values further comprises means for returning a character string that includes each attribute in said share mode.

18. The software license server of claim 16 wherein said means for generating a package ID further comprises:
   means for determining the mode of said feature;
   means for setting said package ID to the hashed value of said share values concatenated with said feature when said mode of said feature is "One Of";
   means for setting said package ID to the node number of said feature when said mode of said feature is "Any Of", said node number based on a number assigned to said feature within a tree representation of said package definition string; and
   means for setting said package ID to the node number of said feature, concatenated with a slot indicated by the combination of said feature and said share values when said mode of said feature is "One Each Of".

19. The software license server of claim 18 wherein said means for determining the mode of said feature further comprises:
   means for finding said feature in the package definition string portion of said license data; and
   means for returning the mode of said feature based upon the syntax of said package definition string.

20. The software license server of claim 18 wherein said means for determining the node number of said feature further comprises:
   means for receiving a package definition string;
   means for receiving a feature to be located in said package definition string;
   means for initializing a count;
   means for finding the next feature in said package definition string;
   means for returning said count when said package definition feature matches said feature to be located; and
   means for incrementing said count when said mode of said package definition feature is "One Each Of" or "Any Of".

21. The software license server of claim 18 wherein said means for determining the slot indicated by the combination of said feature and share values further comprises:
   means for determining whether a slot indicated by the combination of any feature and said share values currently exists when said slot indicated by the combination of said feature and share values does not exist;
   means for returning said slot index when said slot indicated by the combination of said feature and share values exists; and means for determining a minimum slot index without a slot when said slot does not exist.

22. The software license server of claim 21 wherein said means for determining whether a slot indicated by the combination of said feature and said share values exists further comprises:

means for initializing an index;

means for indicating there is no slot when said index is greater than the index of a last slot;

means for incrementing said index when there is a slot at said index and said features and share values do not match; and means for returning said index when there is a slot at said index and said feature and said share values match.

23. The software license server of claim 21 wherein said means for determining whether a slot indicated by the combination of any feature and said share values exists further comprises:

means for initializing an index;

means for indicating there is no slot when said index is greater than the index of a last slot;

means for incrementing said index when there is a slot at said index and said share values do not match; and means for returning said index when there is a slot at said index and said share values match.

24. The software license server of claim 21 wherein said means for determining the minimum slot index without a slot further comprises:

means for initializing an index;

means for returning said index when said index is greater than the index of the last slot; and means for incrementing said index when said index is not greater than the index of the last slot and when there is a slot at said index.

25. The software license server of claim 14 wherein said means for locating and verifying further comprises:

means for updating said internal database and indicating success when said license has a share mode duplicate;

means for receiving a candidate license for said requested feature when said license has no share mode duplicate;

means for verifying other attributes;

means for finding and verifying a parent license of said license;

means for updating said internal database and indicating success when said parent license is available; and means for receiving the next candidate license when said parent license is not available.

26. The software license server of claim 25 wherein said means for determining whether said license has a share mode duplicate further comprises:

means for finding the next license with the requested feature in a database of checked out licenses;

means for indicating said license does not have a share mode duplicate when said license is not found; and means for indicating said license has a share mode duplicate when said share mode attribute values are identical and when there are no more share mode attributes.

27. A program storage device readable by a machine, embodying a program of instructions executable by the machine to perform a method to provide licenses to client computer systems to allow said client computer systems to use licensed software products, the method comprising:

receiving a request for a feature license for a feature included in a package, said request being received from a client computer system that wishes to use said feature, said request optionally including checkout data, said checkout data including at least one desired feature attribute;

filtering said request based on whether said license requires the checkout of a parent license;

granting a package license to said client computer system when said client computer system is allowed to receive said package license according to a license policy, said package license being associated with said package that includes said requested feature, said package license allowing said client computer system to use said requested feature product; and denying said package license to said client computer system when said client computer system is not allowed to receive said package license according to said license policy, wherein said filtering further comprises:

modifying said checkout data when said license requires the checkout of a parent license;

locating said license within a license database; and verifying said license.

28. The program storage device of claim 27 wherein said determining whether said license requires the checkout of a parent license further comprises:

indicating said license request does not require the checkout of a parent license when said license is not associated with a parent license;

indicating said license request does not require the checkout of a parent license when said license does not include a package definition string; and indicating said license request requires the checkout of a parent license when said license has a parent and said license contains a package definition string.

29. The program storage device of claim 27 wherein said modifying checkout data further comprises:

generating share values;

generating a package ID; and setting a modified checkout data value to said share values concatenated with said package ID.

30. The program storage device of claim 29 wherein said generating share values further comprises returning a character string that includes each attribute in said share mode.

31. The program storage device of claim 29 wherein said generating a package ID further comprises:

determining the mode of said feature;

setting said package ID to the hashed value of said share values concatenated with said feature when said mode of said feature is "One Of";

setting said package ID to the node number of said feature when said mode of said feature is "Any Of", said node number based on a number assigned to said feature within a tree representation of said package definition string; and setting said package ID to the node number of said feature, concatenated with a slot indicated by the combination of said feature and said share values when said mode of said feature is "One Each Of".

32. The program storage device of claim 31 wherein said determining the mode of said feature further comprises:

finding said feature in the package definition string portion of said license data; and returning the mode of said feature based upon the syntax of said package definition string.

33. The program storage device of claim 32 wherein said determining the node number of said feature further comprises:

receiving a package definition string;

receiving a feature to be located in said package definition string;

initializing a count;

finding the next feature in said package definition string;

returning said count when said package definition feature matches said feature to be located; and incrementing said count when said mode of said package definition feature is "One Each Of" or "Any Of".

34. The program storage device of claim 31 wherein said determining the slot indicated by the combination of said feature and share values further comprises:

determining whether a slot indicated by the combination of any feature and said share values currently exists when said slot indicated by the combination of said feature and share values does not exist;

returning said slot index when said slot indicated by the combination of said feature and share values exists; and determining a minimum slot index without a slot when said slot does not exist.

35. The program storage device of claim 34 wherein said determining whether a slot indicated by the combination of said feature and said share values exists further comprises:

initializing an index;

indicating there is no slot when said index is greater than the index of a last slot;

incrementing said index when there is a slot at said index and said features and share values do not match; and returning said index when there is a slot at said index and said feature and said share values match.

36. The program storage device of claim 34 wherein said determining whether a slot indicated by the combination of any feature and said share values exists further comprises:

initializing an index;

indicating there is no slot when said index is greater than the index of a last slot;

incrementing said index when there is a slot at said index and said share values do not match; and returning said index when there is a slot at said index and said share values match.

37. The program storage device of claim 34 wherein said determining the minimum slot index without a slot further comprises:

initializing an index;

returning said index when said index is greater than the index of the last slot; and incrementing said index when said index is not greater than the index of the last slot and when there is a slot at said index.

38. The program storage device of claim 31 wherein said locating and said verifying further comprises:

updating said internal database and indicating success when said license has a share mode duplicate;

receiving a candidate license for said requested feature when said license has no share mode duplicate;

verifying other attributes;

finding and verifying a parent license of said license;

updating said internal database and indicating success when said parent license is available; and receiving the next candidate license when said parent license is not available.

39. The program storage device of claim 38 wherein said determining whether said license has a share mode duplicate further comprises:

finding the next license with the requested feature in a database of checked out licenses;

indicating said license does not have a share mode duplicate when said license is not found; and indicating said license has a share mode duplicate when said share mode attribute values are identical and when there are no more share mode attributes.

* * * * *